(12) United States Patent
Goto et al.

(10) Patent No.: US 10,819,388 B2
(45) Date of Patent: Oct. 27, 2020

(54) TRANSMISSION DEVICE, RECEPTION DEVICE, AND COMMUNICATION METHOD

(71) Applicants: SHARP KABUSHIKI KAISHA, Sakai, Osaka (JP); FG INNOVATION COMPANY LIMITED, Tuen Mun, New Territories (HK)

(72) Inventors: Jungo Goto, Sakai (JP); Osamu Nakamura, Sakai (JP); Takashi Yoshimoto, Sakai (JP); Yasuhiro Hamaguchi, Sakai (JP)

(73) Assignees: SHARP KABUSHIKI KAISHA, Sakai, Osaka (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/300,511

(22) PCT Filed: Apr. 28, 2017

(86) PCT No.: PCT/JP2017/016915
§ 371 (c)(1),
(2) Date: Nov. 9, 2018

(87) PCT Pub. No.: WO2017/195654
PCT Pub. Date: Nov. 16, 2017

(65) Prior Publication Data
US 2019/0165826 A1     May 30, 2019

(30) Foreign Application Priority Data

May 12, 2016 (JP) .................................. 2016-096133
Aug. 10, 2016 (JP) .................................. 2016-157352

(51) Int. Cl.
*H04B 1/7097*     (2011.01)
*H04J 11/00*     (2006.01)
(Continued)

(52) U.S. Cl.
CPC ........ *H04B 1/7097* (2013.01); *H04J 11/0026* (2013.01); *H04L 1/0003* (2013.01);
(Continued)

(58) Field of Classification Search
None
See application file for complete search history.

(56) References Cited

U.S. PATENT DOCUMENTS

2010/0157895 A1\* 6/2010 Pani ..................... H04W 52/346
370/328
2012/0218973 A1\* 8/2012 Du ........................ H04W 36/14
370/331
(Continued)

FOREIGN PATENT DOCUMENTS

WO    WO-2017185302 A1 \* 11/2017 .......... H04W 72/042

OTHER PUBLICATIONS

"3rd Generation Partnership Project; Technical Specification Group Radio Access Network; Study on provision of low-cost Machine-Type Communications (MTC) User Equipments (UEs) based on LTE (Release 12)", 3GPP TR 36.888 V12.0.0 (Jun. 2013).
(Continued)

*Primary Examiner* — Chi H Pham
*Assistant Examiner* — Vladislav Y Agureyev
(74) *Attorney, Agent, or Firm* — ScienBiziP, P.C.

(57) ABSTRACT

In a case that a large number of terminal apparatuses accommodated in a contention based radio communication technology share a frequency resource, the number of data signals of the terminal apparatuses which are non-orthogonally multiplexed in the spatial domain increases. Therefore, in a case that the number of non-orthogonally multiplexed data signals of the terminals is considerably large, residual interference after removing interference in the reception processing degrades transmission performance. A transmis-
(Continued)

sion device for transmitting a data signal to a reception device includes a transmission processing unit configured to transmit the data signal without receiving SR transmission and control information for transmission authorization transmitted by the reception device, an identification signal multiplexing unit configured to multiplex an identification signal on an orthogonal resource, and a control information receiving unit configured to receive in advance a transmission parameter associated with the data signal transmission. The transmission parameter includes any of a first data transmission to transmit the data signal by using a continuous frequency resource and a second data transmission to transmit the data by using a discontinuous and equal interval frequency resource.

12 Claims, 35 Drawing Sheets

(51) Int. Cl.
| | | |
|---|---|---|
| | *H04L 5/00* | (2006.01) |
| | *H04L 1/00* | (2006.01) |
| | *H04L 27/26* | (2006.01) |
| | *H04W 72/14* | (2009.01) |

(52) U.S. Cl.
CPC .......... *H04L 5/0051* (2013.01); *H04L 5/0094* (2013.01); *H04L 27/2607* (2013.01); *H04W 72/14* (2013.01); *H04L 5/001* (2013.01); *H04L 5/005* (2013.01); *H04L 5/0055* (2013.01); *H04L 5/0057* (2013.01); *H04L 27/2626* (2013.01); *H04L 27/2647* (2013.01)

(56) References Cited

U.S. PATENT DOCUMENTS

| | | | | |
|---|---|---|---|---|
| 2013/0070703 | A1* | 3/2013 | Yasukawa | H04W 72/0406 370/329 |
| 2013/0329830 | A1* | 12/2013 | Yokomakura | H04B 7/0413 375/295 |
| 2014/0321420 | A1* | 10/2014 | Nakashima | H04J 13/0062 370/330 |
| 2015/0043395 | A1* | 2/2015 | Dai | H04W 72/0453 370/280 |
| 2015/0050938 | A1* | 2/2015 | Uemura | H04W 72/1278 455/452.1 |
| 2016/0056934 | A1* | 2/2016 | Li | H04L 25/0204 370/330 |
| 2016/0254869 | A1* | 9/2016 | Wen | H04L 27/265 370/330 |
| 2016/0337975 | A1* | 11/2016 | Li | H04W 16/14 |
| 2017/0041829 | A1* | 2/2017 | Dai | H04L 5/0044 |
| 2017/0215202 | A1* | 7/2017 | Yang | H04L 5/0055 |
| 2017/0223686 | A1* | 8/2017 | You | H04L 5/0048 |
| 2017/0230956 | A1* | 8/2017 | Kim | H04B 1/713 |
| 2017/0302417 | A1* | 10/2017 | Chun | H04L 5/0007 |
| 2017/0318584 | A1* | 11/2017 | Zeng | H04W 72/0413 |
| 2017/0318598 | A1* | 11/2017 | Islam | H04W 74/08 |
| 2017/0359746 | A1* | 12/2017 | Lee | H04L 5/0044 |
| 2017/0359835 | A1* | 12/2017 | Seo | H04B 7/14 |
| 2018/0098321 | A1* | 4/2018 | Chae | H04L 5/0037 |
| 2018/0199359 | A1* | 7/2018 | Cao | H04W 72/1268 |
| 2018/0249467 | A1* | 8/2018 | Zheng | H04W 56/0005 |
| 2018/0279315 | A1* | 9/2018 | Salem | H04L 1/203 |
| 2018/0279327 | A1* | 9/2018 | Ying | H04W 72/0446 |
| 2018/0288746 | A1* | 10/2018 | Zhang | H04W 72/042 |
| 2018/0295651 | A1* | 10/2018 | Cao | H04W 74/0833 |
| 2019/0123864 | A1* | 4/2019 | Zhang | H04B 7/088 |
| 2019/0268924 | A1* | 8/2019 | Kim | H04W 72/12 |
| 2019/0268938 | A1* | 8/2019 | Zhao | H04L 1/0026 |

OTHER PUBLICATIONS

"3rd Generation Partnership Project; Technical Specification Group GSM/EDGE Radio Access Network; Cellular system support for ultra-low complexity and low throughput Internet of Things (CIoT) (Release 13)", 3GPP TR 45.820 V13.0.0 (Aug. 2015).

* cited by examiner

TRANSMISSION DEVICE, RECEPTION DEVICE, AND COMMUNICATION METHOD

TECHNICAL FIELD

The present invention relates to a transmission device, a reception device, and a communication method.

BACKGROUND ART

In recent years, Fifth Generation mobile telecommunication systems (5G) has attracted attention, and it is expected to specify communication technologies realizing mainly Massive Machine Type Communications (mMTC), which is MTC with a large number of terminal apparatuses, Ultra-reliable and low latency communications, and larger capacity and high speed communication (Enhanced mobile broadband). In particular, it is expected to realize the Internet of Things (IoT) by various equipment in the future, and therefore, realizing of the mMTC is an important aspect of 5G.

For example, in the 3rd Generation Partnership Project (3GPP), Machine-to-Machine (M2M) communication technology has been standardized as Machine Type Communication (MTC) accommodating terminal apparatuses for transmitting and/or receiving a small size of data (NPL 1). Furthermore, Narrow Band-IoT (NB-IoT) has been also gradually specified for supporting low rate data transmission in a narrow band (NPL 2).

In Long Term Evolution (LTE), LTE-Advanced, LTE-Advanced Pro and the like which have been specified in the 3GPP, a terminal apparatus transmits a Scheduling Request (SR) in a case that transmission data traffic is generated and receives control information for transmission authorization (UL Grant) from a base station apparatus, and then, transmits the data by using a transmission parameter of the control information contained in the UL Grant at a prescribed timing. In this way, a radio communication technology is realized in which a base station apparatus performs radio resource control for all uplink data transmissions (the data transmission from a terminal apparatus to a base station apparatus). Therefore, a base station apparatus can realize Orthogonal Multiple Access (OMA) through the radio resource control where uplink data reception is enabled with simple reception processing.

On the other hand, in such a radio communication technology of related art, a base station apparatus performs all radio resources control, and thus control information is required to be transmitted and/or received before data transmission regardless of a data amount to be transmitted by a terminal apparatus. In particular, in a case that a transmitted data size is small, a ratio occupied by the control information is relatively large. For this reason, in a case that a terminal performs small size data transmission, a contention based (Grant Free) radio communication technology is effective in terms of overhead due to control information, in a contention based radio communication technology a terminal apparatus performing the data transmission without SR transmission or reception of UL Grant transmitted by a base station apparatus. Furthermore, in a contention based radio communication technology, the time from data generation until data transmission can be shortened.

CITATION LIST

Non Patent Literature

NPL 1: 3GPP, TR36.888 V12.0.0, "Study on provision of low-cost Machine-Type Communications (MTC) User Equipments (UEs) based on LTE", June 2013

NPL 2: 3GPP, TR45.820 V13.0.0, "Cellular system support for ultra-low complexity and low throughput Internet of Things (CIoT)", August 2015

SUMMARY OF INVENTION

Technical Problem

However, in a case that a large number of terminal apparatuses perform the uplink data transmission by using a contention based radio communication technology, it is assumed that multiple terminal apparatuses share a frequency resource, and therefore, data signals of multiple terminal apparatuses disadvantageously collide with each other at the same time and the same frequency, Even in the case that the data signals collide with each other at the same time and the same frequency, and data from terminal apparatuses the number of which exceeds the number of receive antennas of a base station is non-orthogonally multiplexed in a spatial domain, the base station apparatus can apply, in reception processing, Successive Interference Canceller (SIC), Parallel Interference Canceller (PIC), Symbol Level Interference Canceller (SLIC), or turbo equalization (also referred to as iterative SIC, Turbo SIC, or Iterative PIC) to detect transmission data signals. However, in the case that a large number of terminal apparatuses accommodated in a contention based radio communication technology share the frequency resource, the more the number of accommodated terminal apparatuses, the more the number of data signals of the terminal apparatuses which are non-orthogonally multiplexed in the spatial domain. In a case that the number of non-orthogonally multiplexed data signals of terminals is considerably increased, interference is not removed in the reception processing, and residual interference has disadvantageously degraded transmission performances.

The present invention has been made in light of the foregoing, and has an object to provide a communication method for reducing interference of signals which are non-orthogonally multiplexed in the spatial domain in a case that a large number of terminal apparatuses perform uplink data transmission by using a contention based radio communication technology.

Solution to Problem (1) The present invention is made in order to solve the above problem, and an aspect of the present invention is a transmission device for transmitting a data signal to a reception device, the transmission device including a transmission processing unit configured to transmit the data signal without receiving control information for transmission authorization transmitted by the reception device, an identification signal multiplexing unit configured to multiplex an identification signal on an orthogonal resource, and a receiving unit configured to receive a transmission parameter in advance, the transmission parameter being capable of indicating, for transmitting the data signal, a use of a continuous frequency resource and a use of a discontinuous and equal interval frequency resource, wherein the transmission processing unit transmits the data signal, based on the transmission parameter by any of a first data transmission to transmit the data signal by using the continuous frequency resource, and a second data transmission to transmit the data by using the discontinuous and equal interval frequency resource.

(2) In an aspect of the present invention, the transmission processing unit uses a third data transmission to transmit the data signal by using a discontinuous and unequal interval frequency resource.

(3) In an aspect of the present invention, the identification signal multiplexing unit multiplexes the identification signal on a frequency resource different from the frequency resource used to transmit the data signal.

(4) In an aspect of the present invention, the identification signal multiplexing unit multiplexes the identification signal on the number of frequency resources which is more than the number of frequency resources used to transmit the data signal.

(5) In an aspect of the present invention, the transmission processing unit determines an OFDM symbol to be used depending on a subframe number for transmitting the data signal in a case that only some of OFDM symbols in a subframe are used to transmit the data signal.

(6) In an aspect of the present invention, the transmission processing unit determines a slot to be used depending on a subframe number for transmitting the data signal in a case that only some of OFDM symbols in a subframe are used to transmit the data signal.

(7) An aspect of the present invention is a reception device for receiving a data signal from each of multiple transmission devices, the reception device including: a reception processing unit configured to receive the data signal transmitted without transmitting control information for transmission authorization, an identification signal demultiplexing unit configured to demultiplex an identification signal received together with the data from an orthogonal resource, a transmission terminal identification unit configured to identify, based on the identification signal, the transmission device having performed data transmission, and a control information transmission unit configured to transmit in advance a transmission parameter to be used for the data transmission, wherein the transmission parameter transmitted by the control information transmission unit includes information of a frequency resource used for the data transmission for each of the multiple transmission devices, and the information of the frequency resource is capable of indicating a use of a continuous frequency resource and a use of a discontinuous and equal interval frequency resource.

(8) In an aspect of the present invention, the information of the frequency resource transmitted by the control information transmission unit includes a discontinuous and unequal interval frequency resource.

(9) In an aspect of the present invention, the information of the frequency resource used to transmit the identification signal by any of the multiple transmission devices included in the transmission parameter transmitted by the control information transmission unit is different from the frequency resource used to transmit the identification signal.

(10) In an aspect of the present invention, the reception processing unit computes an OFDM symbol for receiving the data signal from a subframe number in a case that the transmission device uses only some of OFDM symbols in a subframe to transmit the data signal.

(11) A communication method of a transmission device for transmitting a data signal to a reception device, the communication method including the steps of transmitting the data signal without receiving control information for transmission authorization transmitted by the reception device, multiplexing an identification signal on an orthogonal resource, and receiving a transmission parameter in advance, the transmission parameter being capable of indicating, for transmitting the data signal, a use of a continuous frequency resource and a use of a discontinuous and equal interval frequency resource, wherein in the transmitting step, the data signal is transmitted, based on the transmission parameter by any of a first data transmission to transmit the data signal by using the continuous frequency resource, and a second data transmission to transmit the data by using the discontinuous and equal interval frequency resource.

(12) A communication method of a reception device for receiving a data signal from each of multiple transmission devices, the communication method including the steps of receiving the data signal transmitted without transmitting control information for transmission authorization, demultiplexing an identification signal received together with the data from an orthogonal resource, identifying, based on the identification signal, the transmission device having performed data transmission, and transmitting in advance a transmission parameter to be used for the data transmission, wherein the transmission parameter includes information of a frequency resource used for the data transmission for each of the multiple transmission devices, and the information of the frequency resource is capable of indicating a use of a continuous frequency resource and a use of a discontinuous and equal interval frequency resource.

Advantageous Effects of Invention

According to the present invention, it is possible to reduce interference of signals which are non-orthogonally multiplexed in the spatial domain in a case that a large number of terminal apparatuses perform uplink data transmission by using a contention based radio communication technology. As a result, a base station apparatus can realize accommodation of a large number of terminal apparatuses and reduction in the control information amount.

DESCRIPTION OF EMBODIMENTS

Hereinafter, embodiments are described with reference to the drawings. In each embodiment described below, a description is given on the premise of Machine-to-Machine Communication (M2M communication, also referred to as Machine Type Communication (MTC), communication for Internet of Things (IoT), Narrow Band-IoT (NB-IoT), and Cellular IoT (CIoT)), and assuming that a transmission device is an MTC terminal (hereinafter, referred to as a terminal apparatus) and a reception device is a base station apparatus. However, each embodiment is not limited to this example, and is applicable to uplink transmission in a cellular system and in this case, a terminal apparatus performing the data transmission involved by a person is the transmission device and a base station apparatus is the reception device. Each embodiment is also applicable to downlink transmission in an acellular system, and in this case, the transmission device and the reception device for the data transmission are reverse to the case of the uplink transmission. Each embodiment is also applicable to Device-to-Device (D2D) communication, and in this case, both the transmission device and the reception device are a terminal apparatus.

Figure 1:
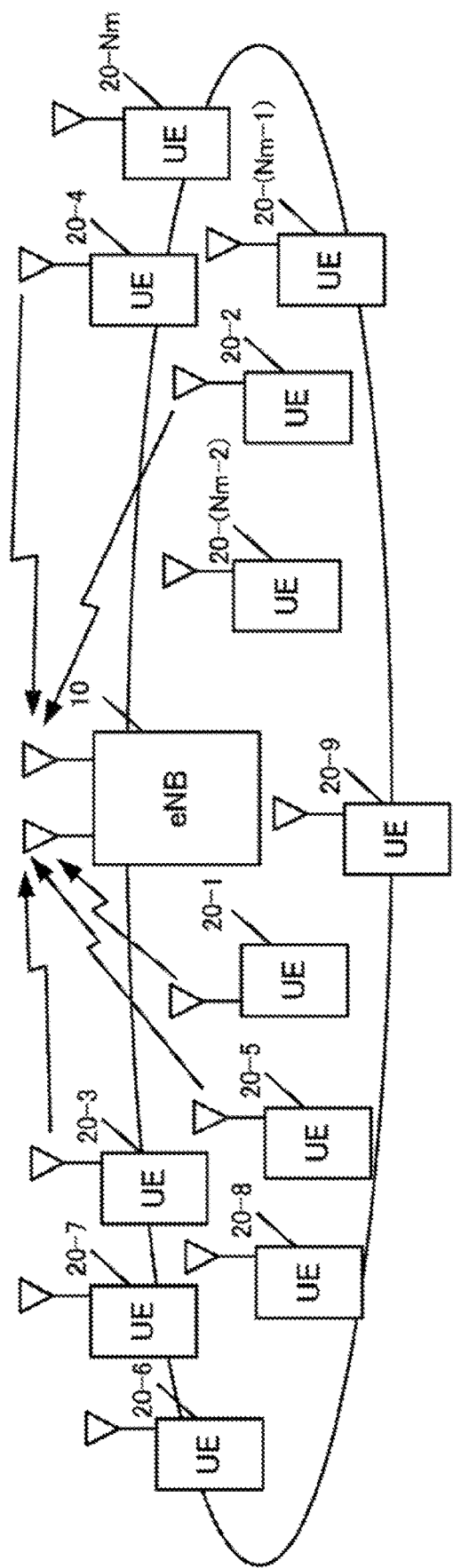
FIG. 1 is a diagram illustrating an example of a configuration of a system according to the present embodiment.

FIG. 1 illustrates an example of a configuration of a system according to the present embodiment. The system includes a base station apparatus 10, and terminal apparatuses 20-1 to 20-Nm. Note that the number of terminal apparatuses (terminals, mobile terminals, mobile stations, User Equipment (UEs)) is not limited, and the number of antennas of each apparatus may be one or multiple. The base station apparatus 10 may perform communication using a so-called licensed band which is licensed by a country or region and of which service is provided by a wireless operator, or may perform communication using a so-called unlicensed band which does not require licensing by a country or region. The base station apparatus 10 may be a macro base station apparatus with a wide coverage, or a small cell base station or pico base station apparatus (also referred to as Pico evolved Node B (eNB), SmallCell, Low Power Node, Remote Radio Head) which is narrower in coverage than the macro base station apparatus. A frequency band other than the licensed band is not limited to the example of the unlicensed band herein, and may be a white band (white space) or the like. The base station apparatus 10 may apply Carrier Aggregation (CA) technique which uses multiple Component Carriers (CC, or also referred to as Serving cells) in a band used in the LTE communication, and perform data transmission of the MTC and communication different from the MTC by using the different CCs, or perform the data transmission by using the same CC. As an example in which the CA is applied, the communication different from the MTC may be for a Primary cell (PCell), and the MTC communication may be for a Secondary cell (SCell), Subcarriers (frequency) and slots or subframes (time) which are to be used may be divided between the communication different from the MTC and the MTC in the same CC.

Assume that the terminal apparatuses 20-1 to 20-Nm can transmit MTC data to the base station apparatus 10. The terminal apparatuses 20-1 to 20-Nm, at the time of connecting to the base station, receive in advance, from the base station apparatus 10 or another base station apparatus, the control information required for the data transmission. The terminal apparatuses 20-1 to 20-Nm perform the data transmission by using the radio communication technology which does not require transmitting the Scheduling Request (SR) or receiving the control information for transmission authorization (UL Grant) transmitted from the base station apparatus, after the data to be transmitted (traffic) is generated (the radio communication technology is also referred to as a contention based radio communication technology, Contention based access, Grant free access, Grant free communication, Grant free data transmission, Grant less access, autonomous access, or the like, and hereinafter, referred to as a contention based radio communication technology). However, in a case that the terminal apparatuses 20-1 to 20-Nm can use also the radio communication technology requiring the SR transmission and the UL Grant reception in Long Term Evolution (LTE), LTE-Advanced, LTE-Advanced Pro, and the like (the radio communication technology is also referred to as non-contention based radio communication technology, Grant-based access, Grant-based communication, Grant-based data transmission, Scheduled access, and the like, and hereinafter, also referred to as the non-contention based radio communication technology), the terminal apparatuses 20-1 to 20-Nm may switch for use between a contention based radio communication technology and the non-contention based radio communication technology depending on the transmission data, the data size, and a Quality of Service (QoS) of the transmission data. In other words, the terminal apparatuses 20-1 to 20-Nm may determine whether to perform the data transmission using the radio resource scheduled from the base station apparatus by performing the SR transmission before the data transmission, or to perform the data transmission using at least a part of the radio resource which is specified in advance before data generation. The QoS may include reliability of the data transmission, a delay in the data transmission, and a communication speed, and may further include an indicator representing a power consumption for the data transmission by the terminal apparatus (e.g., power per 1 bit in the data transmission) or the like. Here, the terminal apparatuses 20-1 to 20-Nm are not limited only the MTC, and may be capable of Human-to-Machine Communication (H2M communication) or Human-to-Human Communication (H2H communication) which is involved by a person. In this case, the base station apparatus 10 may transmit the UL Grant which is the control information including a transmission parameter used for the data transmission by dynamic scheduling or Semi-Persistent Scheduling (SPS) depending on a data type, on a Physical Downlink Control CHannel (PDCCH) or an Enhanced PDCCH (EPDCCH) or another physical channel for transmitting downlink control information. The terminal apparatuses 20-1 to 20-Nm performs the data transmission based on the transmission parameter in the UL Grant.

First Embodiment

Figure 2:
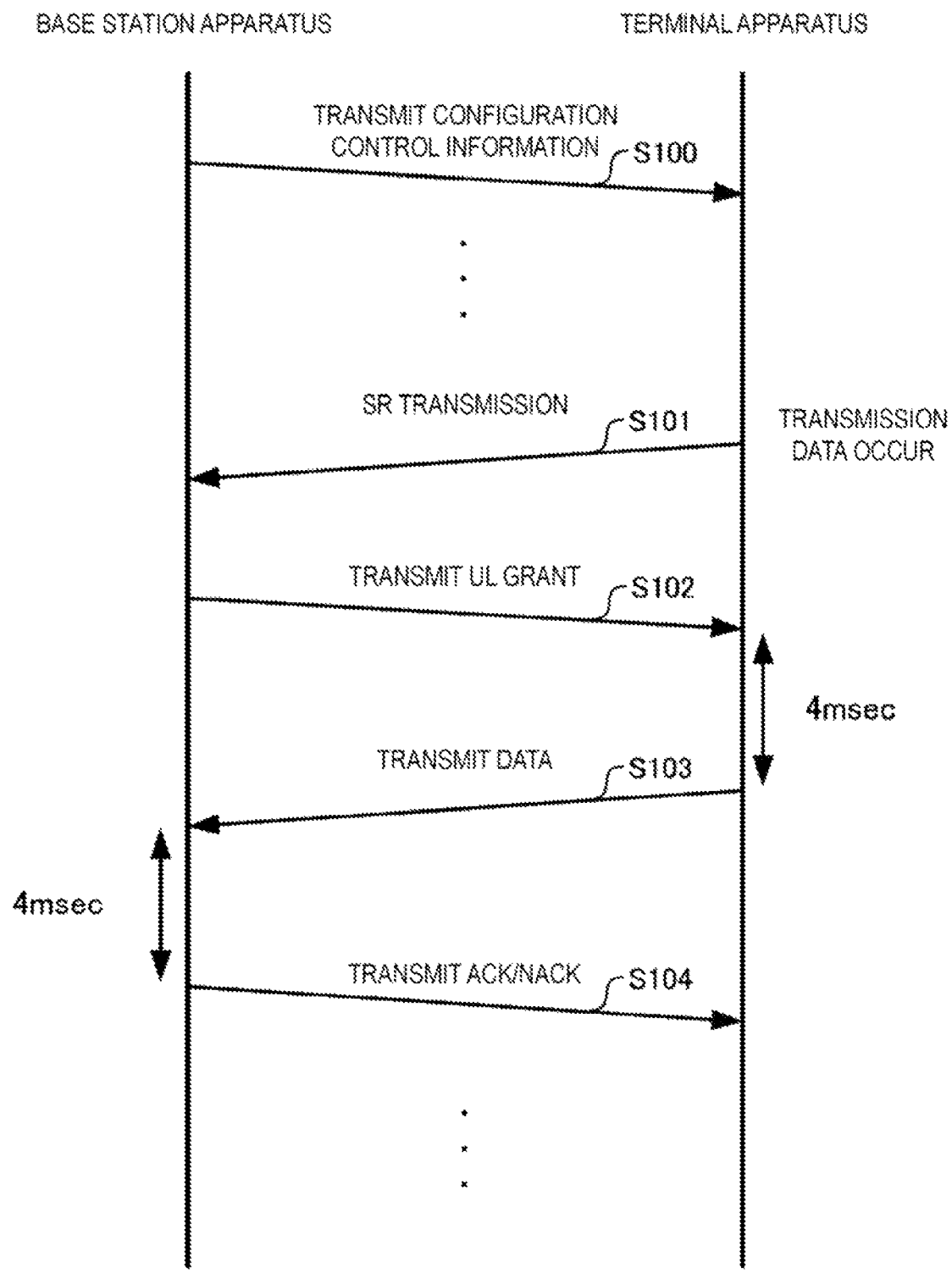
FIG. 2 is a diagram illustrating an example of a sequence chart of data transmission by a terminal apparatus according to a radio communication technology in the related art.

FIG. 2 illustrates an example of a sequence chart of data transmission by a terminal apparatus according to a radio communication technology in the related art. A base station apparatus transmits configuration control information at the time of connecting with the terminal apparatus (S100). The configuration control information may be notified with Radio Resource Control (RRC), or may be higher layer control information such as a System Information Block (SIB), or a DCI format. A physical channel to be used may be the PDCCH, the EPDCCH, or a Physical Downlink Shared CHannel (PDSCH), or another physical channel may be used. In a case that uplink data is generated and the terminal apparatus has not received the UL Grant, the terminal apparatus transmits the SR to request the UL Grant (S101). The base station apparatus receives the SR, and thereafter, transmits the UL Grant to the terminal apparatus on the PDCCH or the EPDCCH (S102). In a case of Frequency Division Duplex (FDD, also referred to as frame structure type 1), the terminal apparatus performs data transmission based on a transmission parameter included in the UL Grant in a subframe 4 msec after a subframe in which the UL Grant is detected by blind coding of the PDCCH or the EPDCCH (S103). However, although the interval is not limited to 4 msec in a case of Time Division Duplex (TDD, or also referred to as frame structure type 2), a description is given on the premise of the FDD for the purpose of simple description. The base station apparatus detects the data transmitted by the terminal apparatus, and transmits an ACK/NACK indicating whether or not an error is included in data detected in a subframe 4 msec after a subframe at which the base station apparatus receives a data signal (S104). Here, in a case that the terminal apparatus is not notified of, at S101, a resource for the SR transmission with the RRC, the terminal apparatus uses a Physical Random Access CHannel (PRACH) to request the UL Grant. In a case of the dynamic scheduling at S102, the data transmission of only one subframe can be made, but in a case of the SPS, assume that periodical data transmission is permitted and information such as a period of the SPS is notified with the RRC at S100. The terminal apparatus stores the transmission parameter such as the resource for the SR transmission, the SPS period, and the like which are notified of by the base station apparatus with the RRC.

Figure 3:
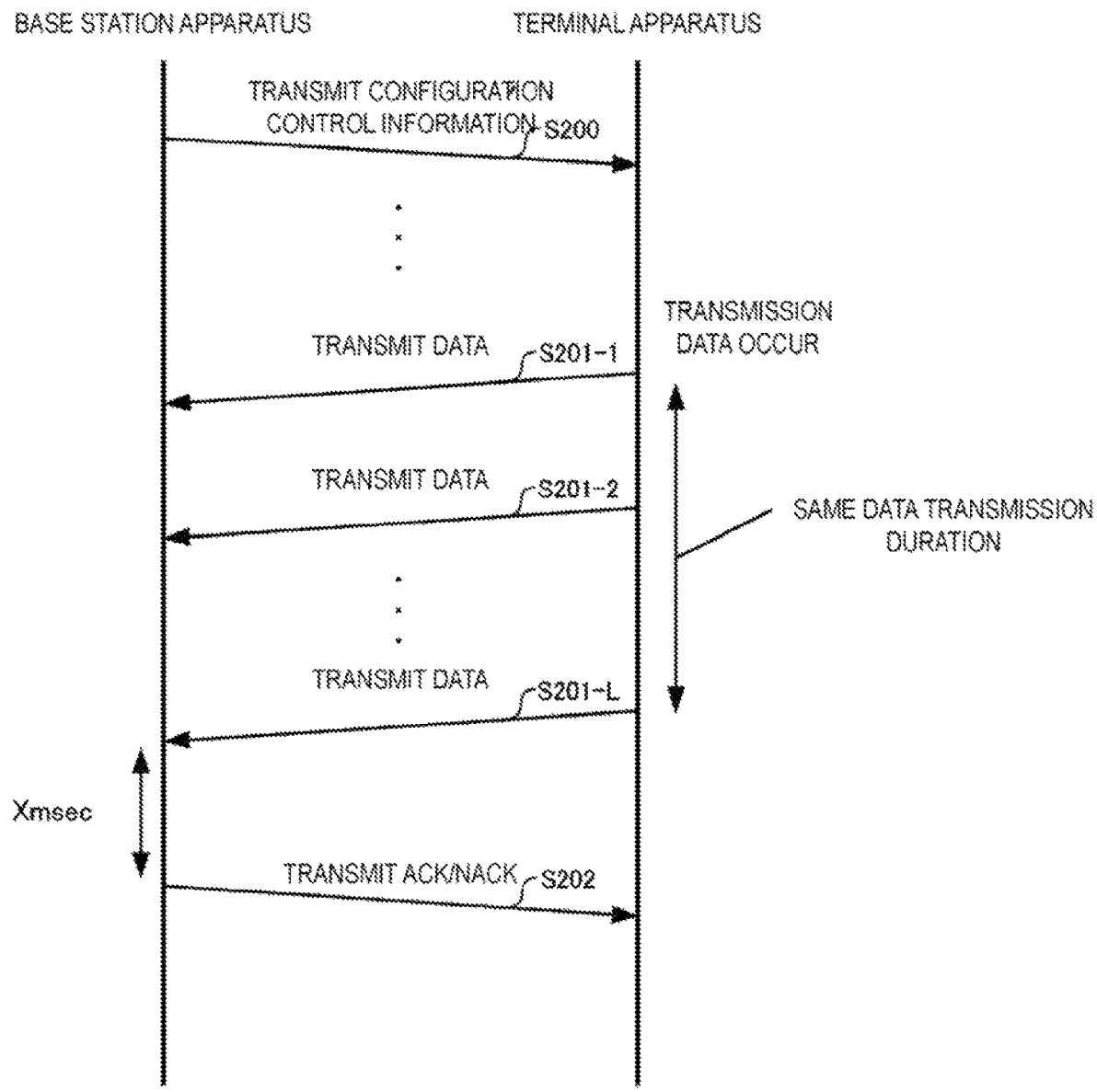
FIG. 3 is a diagram illustrating an example of a sequence chart of data transmission by a terminal apparatus according to a radio communication technology of the present embodiment.

FIG. 3 illustrates an example of a sequence chart of data transmission by the terminal apparatus according to a radio communication technology of the present embodiment. First, the base station apparatus transmits configuration control information at the time of connecting with the terminal apparatus (S200). The configuration control information may be notified with RRC, or may be higher layer control information such as an SIB, or a DCI format. The physical channel to be used may be the PDCCH, the EPDCCH, or the PDSCH, or another physical channel may be used. This configuration control information includes the radio resource, the transmission parameter, and the like used in a contention based radio communication technology. In the case that the terminal apparatus can also use the non-contention based radio communication technology in LTE, LTE-Advanced, LTE-Advanced Pro and the like, the control information notified at S100 in FIG. 2 may be also included. In a case that the uplink data is generated and the terminal apparatus receives the control information at S200, the terminal apparatus transmits the data using a contention based radio communication technology which does not require the SR transmission or reception of the Grant transmitted by the base station apparatus (S201-1). Here, the terminal apparatus, which is already notified of, at S200, the number of transmission times of the same data, a transmission duration, a transmission period, the radio resource used for the transmission, the transmission parameter, and the like, and transmits the same data as data at S201-1 based on the control information received at S200, depending on the required QoS (which may also include reliability of the data transmission, delay time in the data transmission, and a communication speed) (S201-2 to S201-L). However, the present invention is not limited to transmitting the same data multiple times, and may transmit only one time with assuming L=1. The base station apparatus detects the data transmitted by the terminal apparatus, and transmits an ACK/NACK indicating whether or not an error is included in data detected in a subframe X msec after a subframe at which the base station apparatus receives a data signal (S202). However, X=4 after the data transmission, or a different value may be adopted similarly to FDD in the related art. In FIG. 3, the last data transmission (S201-L) is used as reference, but without limitation on this example, and for example, X msec after a subframe as a reference in which the base station apparatus can detect data without an error may be adopted, and in this case, the data transmission of the same data may be stopped at the time of detecting the ACK/NACK by the terminal. In a contention based radio communication technology, the ACK/NACK may not be transmitted, and the base station apparatus may switch whether to transmit the ACK/NACK depending on the non-contention based and contention based radio communication technologies.

Figure 4:
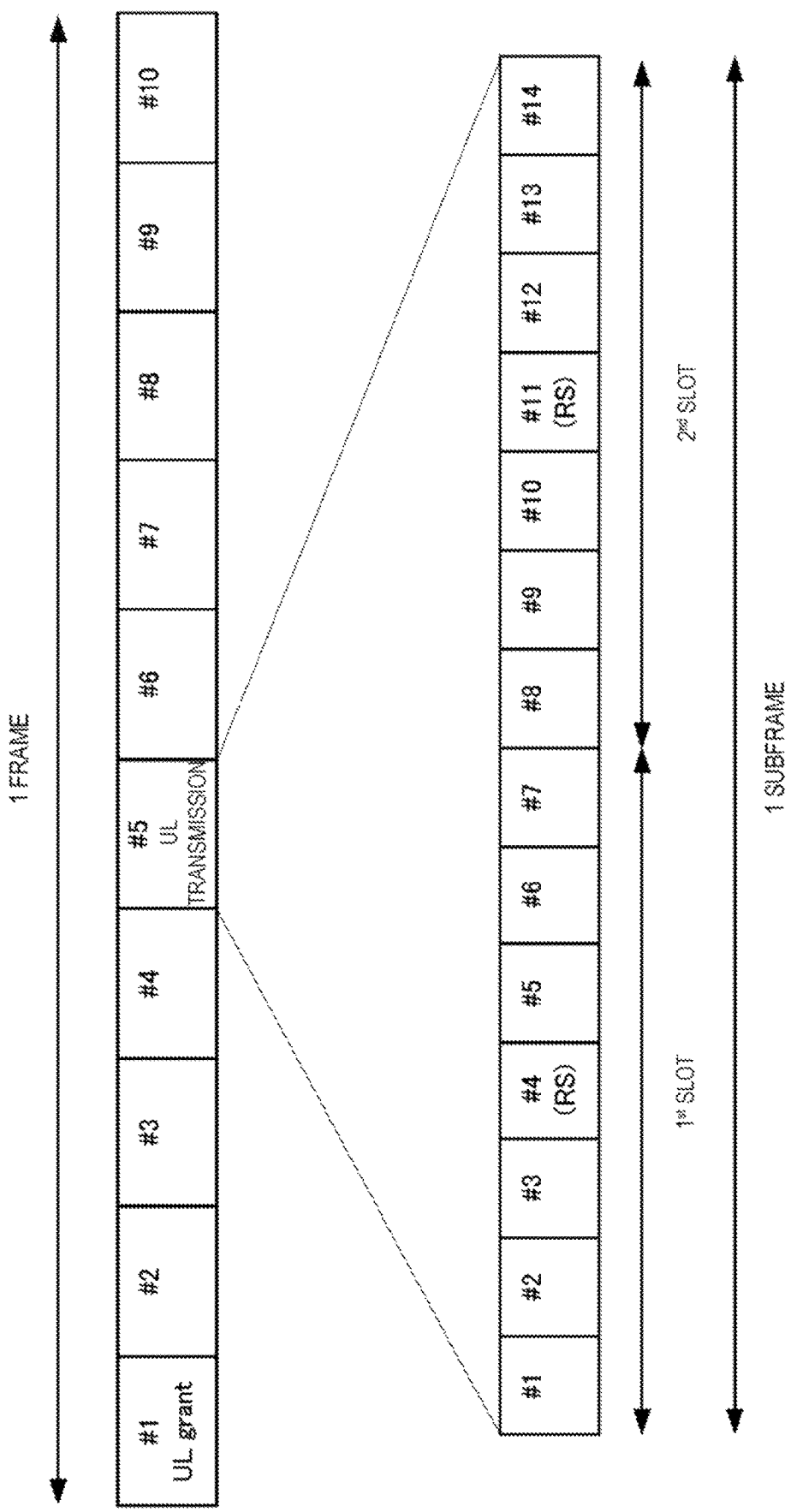
FIG. 4 is a diagram illustrating an example of an uplink frame structure according to the radio communication technology in the related art.
Figure 5:
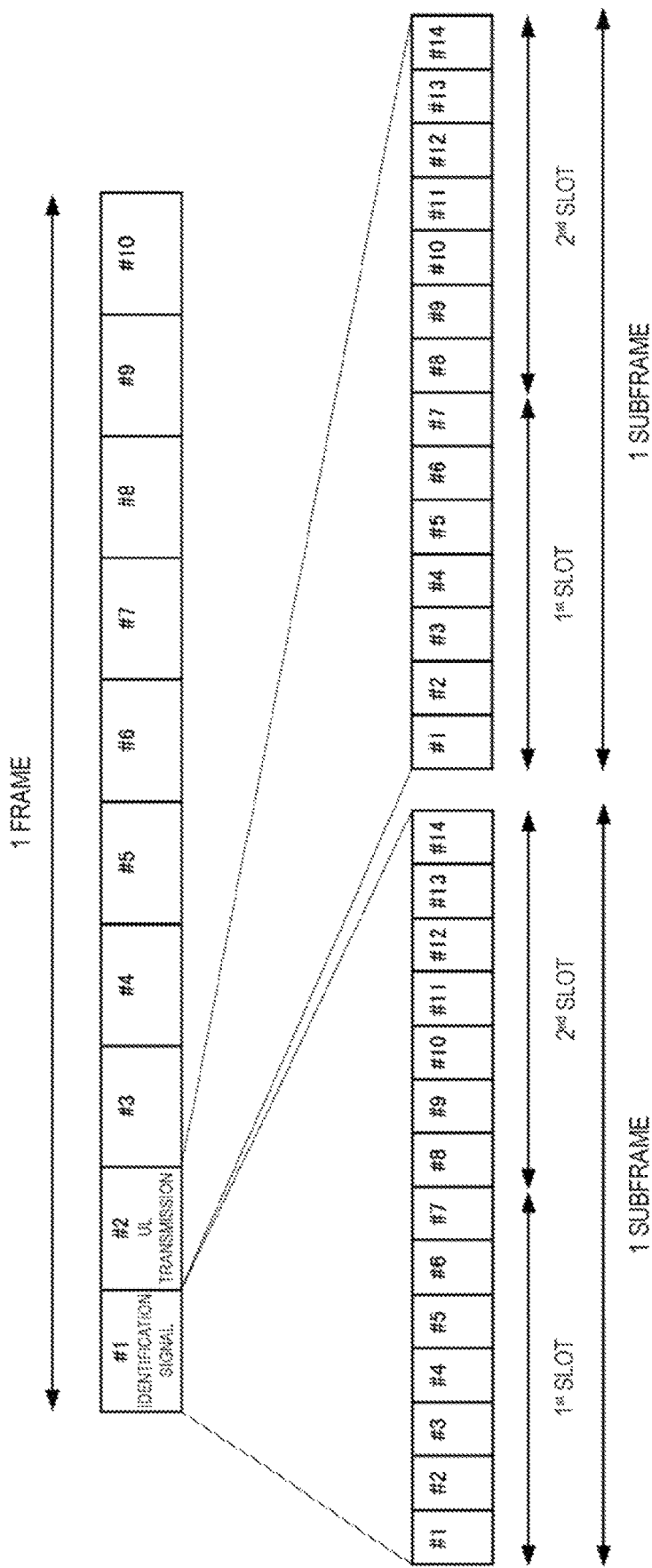
FIG. 5 is a diagram illustrating an example of an uplink frame structure according to the radio communication technology of the present embodiment.

FIG. 4 illustrates an example of an uplink radio frame structure according to the radio communication technology in the related art. The uplink frame structure in the related art includes 10 subframes with one frame being 10 msec, and one subframe includes two slots and one slot includes 7 OFDM symbols. A Dc-Modulation Reference Signal (DMRS) is located at the center OFDM symbol of each slot, specifically, an OFDM symbol #4 in a case that OFDM symbols #1 to #7 exist. In the related art, in a case that the terminal apparatus receives UL Grant in a subframe #1, the terminal apparatus can perform the data transmission in a subframe #5 which is 4 msec after the subframe #1. FIG. 5 illustrates an example of an uplink radio frame structure according to the radio communication technology of the present embodiment. FIG. 5 illustrates an example of a case that a frame structure is the same as that in FIG. 4 and a contention based radio communication technology is used. In a contention based radio communication technology, the terminal apparatus can perform the data transmission immediately after the data generation, and in a case that data is generated before the subframe #1, the data transmission illustrated in the example in FIG. 5 is performed. A signal for identifying a transmission terminal is transmitted in the subframe #1 and the data is transmitted in the subframe #2. The signal for identifying a transmission terminal and the data transmission method are described in detail later.

Figure 6:
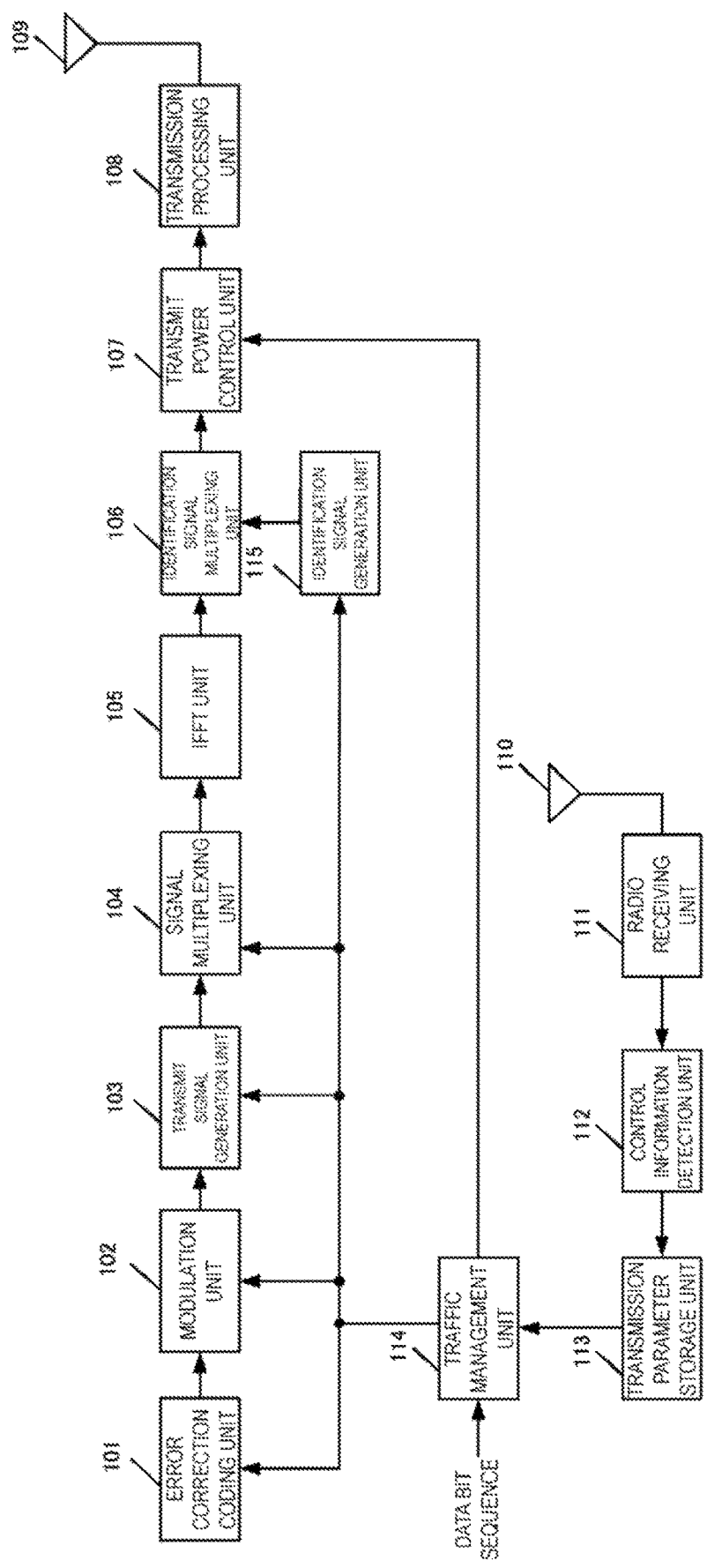
FIG. 6 is a diagram illustrating an example of a configuration of a terminal apparatus according to the present embodiment.

FIG. 6 illustrates an example of a configuration of the terminal apparatus according to the present embodiment. Here, FIG. 6 illustrates minimum blocks needed for the present invention. A description is given on the premise that the terminal apparatus can use both a contention based radio communication technology and non-contention based radio communication technology in the related art described above, for the MTC data transmission like the terminal apparatuses 20-1 to 20-Nm. However, the present invention may be applied to even a case that the terminal apparatus can use only a contention based radio communication technology, and in this case, there is no processing concerning the non-contention based radio communication technology, but the basic configuration is the same. The terminal apparatus receives the control information transmitted on the EPDCCH, the PDCCH, or the PDSCH from the base station apparatus through a receive antenna 110. A radio receiving unit 111 down-converts a reception signal into a baseband frequency, and performs Analog/Digital (A/D) conversion to input a signal obtained by removing a Cyclic Prefix (CP) from the digital signal to a control information detection unit 112. The control information detection unit 112 detects, by blind coding, the Downlink Control Information (DCI) format transmitted on the PDCCH or the EPDCCH to the terminal of itself. In the blind coding, decoding processing is performed on a Common Search Space (CSS) or a UE-specific Search Space (USS) which is a candidate that the DCI format is located, and in a case that detection can be made with no error hit in a Cyclic Redundancy Check (CRC) added to data signal, the control information is detected as that destined to the terminal of itself. The base station apparatus adds to the data signal the CRC obtained by exclusive OR operation using a Cell-Radio Network Temporary Identifier (C-RNTI), a SPS C-RNTI or the like which is an ID unique to the destination terminal apparatus so that only the destination terminal apparatus can detect the control information. Therefore, before determining whether or not the error bit is present with the CRC, the terminal apparatus performs exclusive OR operation between the CRC and the C-RNTI or the SPS C-RNTI to determine whether or not the error bit is present with the CRC in accordance with an operation result. Here, for the DCI format, multiple formats are defined depending on the application, for example, DCI format 0 for an uplink single antenna and DCI format 4 for Multiple Input Multiple Output (MIMO). The control information detection unit 112 makes a detection also in a case of receiving an RRC signal. The control information detection unit 112 inputs the detected control information in a transmission parameter storage unit 113, The transmission parameter storage unit 113, in a case of receiving the UL Grant such as the dynamic scheduling or the SPS, inputs the control information to a traffic management unit 114. The transmission parameter storage unit 113, in a case of receiving the configuration control information with the RRC, holds these pieces of control information until performing the data transmission using a contention based radio communication technology. The configuration control information held by the transmission parameter storage unit 113 is described later.

Input to the traffic management unit 114 are a bit sequence of the transmission data, the control information in a case of receiving the UL Grant. In a case of receiving in advance the configuration control information for a contention based radio communication technology, input to the traffic management unit 114 includes the control information. To the traffic management unit 114, a type of the transmission data, the QoS and the like may be input. The traffic management unit 114 selects from the input information the use of a contention based or non-contention based radio communication technology, inputs the transmission parameter of the selected radio communication technology to an error correction coding unit 101, a modulation unit 102, the transmit signal generation unit 103, the signal multiplexing unit 104, and an identification signal generation unit 115, and inputs the data bit sequence to the error correction coding unit 101.

The error correction coding unit 101 codes the input data bit sequence with an error correction code. Examples of the error correction code to be used include a turbo code, a Low Density Parity Check (LDPC) code, a convolutional code, and a Polar code. A type of the error correction code or a coding rate by the error correction coding unit 101 may be predefined in the transmission and/or reception device, input from the traffic management unit 114, or switched depending on a contention based or non-contention based radio communication technology. In a case that the type of the error correction coding or the coding date is notified as the control information, these pieces of information are input from the traffic management unit 114 to the error correction coding unit 101. The error correction coding unit 101 may puncture (cull) or interleave (rearrange) a coding bit sequence depending on the adopted coding rate. In a case that the error correction coding unit 101 interleaves the coding bit sequence, the error correction coding unit 101 performs interleave such that a sequence is different for each terminal apparatus. The error correction coding unit 101 may adopt scrambling. Here, the scrambling may be adopted only in a case that the base station apparatus can uniquely discriminate a scrambling pattern used by the terminal apparatus, based on the identification signal described later. A spreading code may be applied to coded bits obtained by the error correction coding. The spreading code may be used at all the coding rates used in the data transmission, or the spreading code may be used at a specific coding rate. As an example of a case that the spreading code is used only with a specific coding rate, only in a case that the data transmission is performed at a coding rate which is lower than the coding rate for a case of transmitting the all coded bits obtained by the error correction coding (e.g., only in a case of being lower than ⅓ in a case of the turbo code), the spreading code is used. Switching may be made such that the spreading code is used in the data transmission at the lower coding rate using a contention based radio communication technology, and the spreading code is not used in the data transmission at the lower coding rate using the non-contention based radio communication technology.

The modulation unit 102 receives information of a modulation scheme input from the traffic management unit 114 and modulates the coded bit sequence input from the error correction coding unit 101 to generate a modulation symbol sequence. Examples of the modulation scheme include Quaternary Phase Shift Keying (QPSK), 16-ary Quadrature Amplitude Modulation (16 QAM), 64 QAM, and 256 QAM. The modulation scheme may not be Gray labeling, but set partitioning may be used. Gaussian Minimum-Shift Keying (GMSK) may be also used. The modulation unit 102 outputs the generated modulation symbol sequence to the transmit signal generation unit 103. Here, the modulation scheme or a modulation method may be predefined in the transmission and/or reception device, input from the traffic management unit 114, or switched depending on a contention based or non-contention based radio communication technology. The spreading code may also be used. This means that the spreading code is not applied to the coded bit sequence after the error correction coding but applied to the modulation symbol sequence. The spreading code may be used with all modulation orders (the number of bits contained in one modulation symbol) or coding rates used in the data transmission, the spreading code may be used with all Modulation and Coding Schemes (MCS, a combination of the modulation order and the coding rate), or the spreading code may be used with a specific modulation order, a specific coding rate, or a specific MCS. As an example of the case that the spreading code is used with a specific modulation order, the spreading code s used only in the data transmission with BPSK or QPSK. As an example of the case that the spreading code is used with a specific coding rate, only in a case that the data transmission is performed at a coding rate which is lower than the coding rate for a case of transmitting the all coded bits obtained by the error correction coding (e.g., only in a case of being lower than ⅓ in a case of the turbo code), the spreading code is used. As an example of the case that the spreading code is used with a specific MCS, only in a case that the data transmission is performed at a coding rate which is lower than the coding rate for a case of transmitting the all coded bits obtained by BPSK or QPSK and the error correction coding (e.g., only in a case of being lower than ⅓ in a case of the turbo code), the spreading code is used, Switching may be made such that the spreading code is used in the data transmission at the lower coding rate using a contention based radio communication technology, and the spreading code is not used in the data transmission using the non-contention based radio communication technology.

Figure 7:
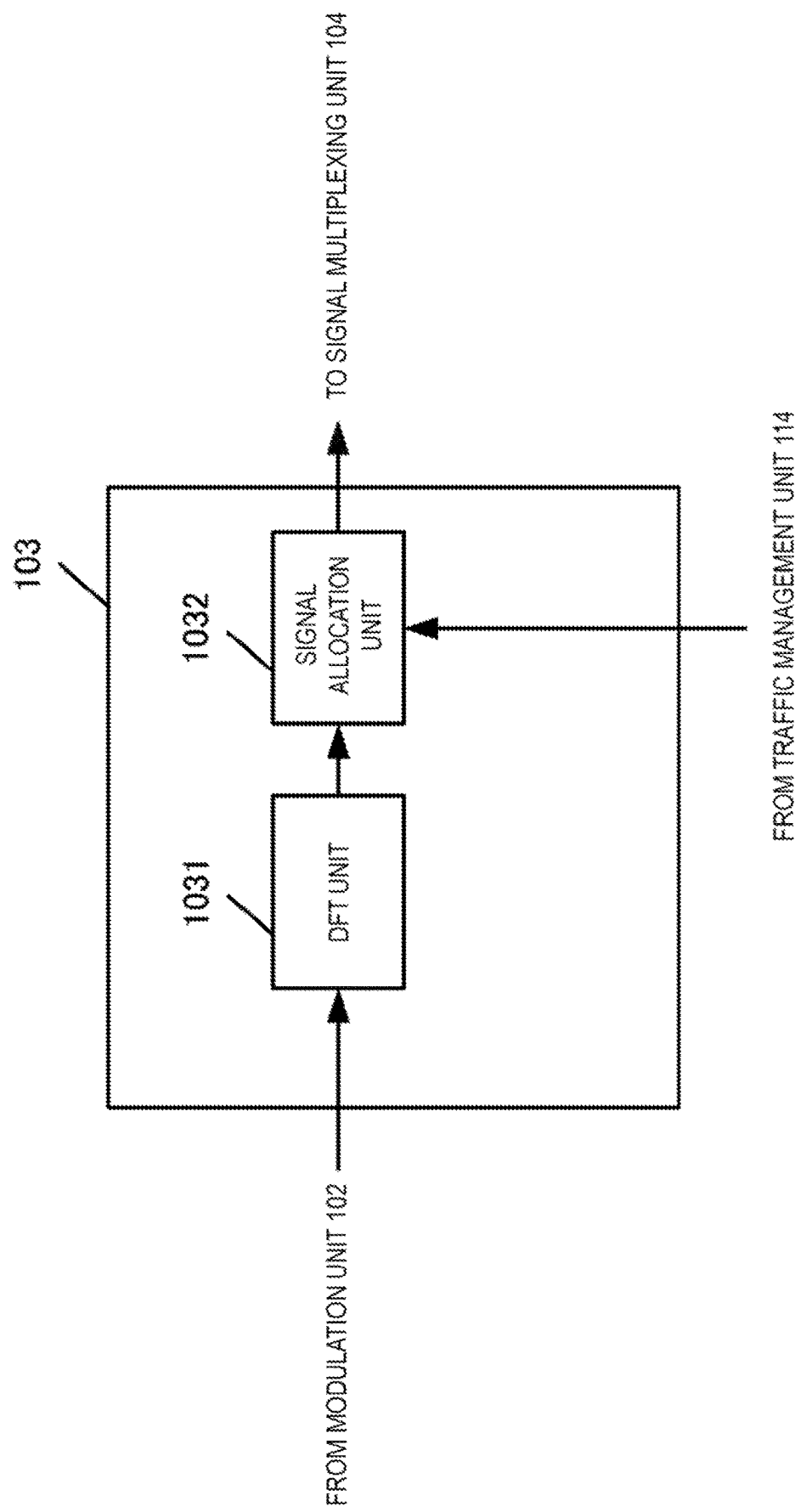
FIG. 7 is a diagram illustrating an example of a configuration of a transmit signal generation unit 103 according to the present embodiment.

Each of FIG. 7 to FIG. 10 illustrates an example of a configuration of the transmit signal generation unit 103 according to the present embodiment. In FIG. 7, a DFT unit 1031 performs discrete Fourier transform on the input modulation symbol to convert a time domain signal into a frequency domain signal, and outputs the obtained frequency domain signal to a signal allocation unit 1032. The signal allocation unit 1032 receives resource allocation information input from the traffic management unit 114, the resource allocation information being information of one or more Resource Blocks (RBs) used for the data transmission, and allocates the transmit signal in the frequency domain to a specified RB. The resource allocation information input from the traffic management unit 114 is notified with the UL Grant in a case of the non-contention based radio communication technology, and is notified in advance with the configuration control information in a case of a contention based radio communication technology. Here, one RB is defined by 12 subcarriers and one slot (7 OFDM symbols), and the resource allocation information is information for allocating one subframe (two slots). In LTE, one subframe corresponds to 1 msec and a subcarrier spacing corresponds to 15 kHz, but the one subframe time and the subcarrier spacing may have different values such as 4 msec and 3.75 kHz, 2 msec and 7.5 kHz, 0.2 msec and 75 kHz, 0.1 msec and 150 kHz, or the like, and the resource allocation information may be notified in units of one subframe even in a different frame structure. The resource allocation information may notify multiple subframes allocation either in a case of the same subframe structure as that in LTE or different subframe structure from that in LTE, may notify allocation in units of a slot, may notify allocation in units of an OFDM symbol, or may notify allocation in units of multiple OFDM symbols such as in units of 2 OFDM symbols. The resource allocation information may be not in units of RB but in units of one subcarrier, or may be in units of a Resource Block Group (RBG) including multiple RBs, where allocation may be made for one or more RBGs. The resource allocation information is not limited to continuous RBs or continuous subcarriers, and may be discontinuous RBs or discontinuous subcarriers. The terminal apparatus may use, for the data transmission, only some of the RBs or subcarriers indicated by the resource allocation information. In this case, the base station apparatus is required to notify in advance the information of the RBs or subcarriers used for the data transmission by the terminal apparatus, or to be able to detect the information through another signal.

Figure 8:
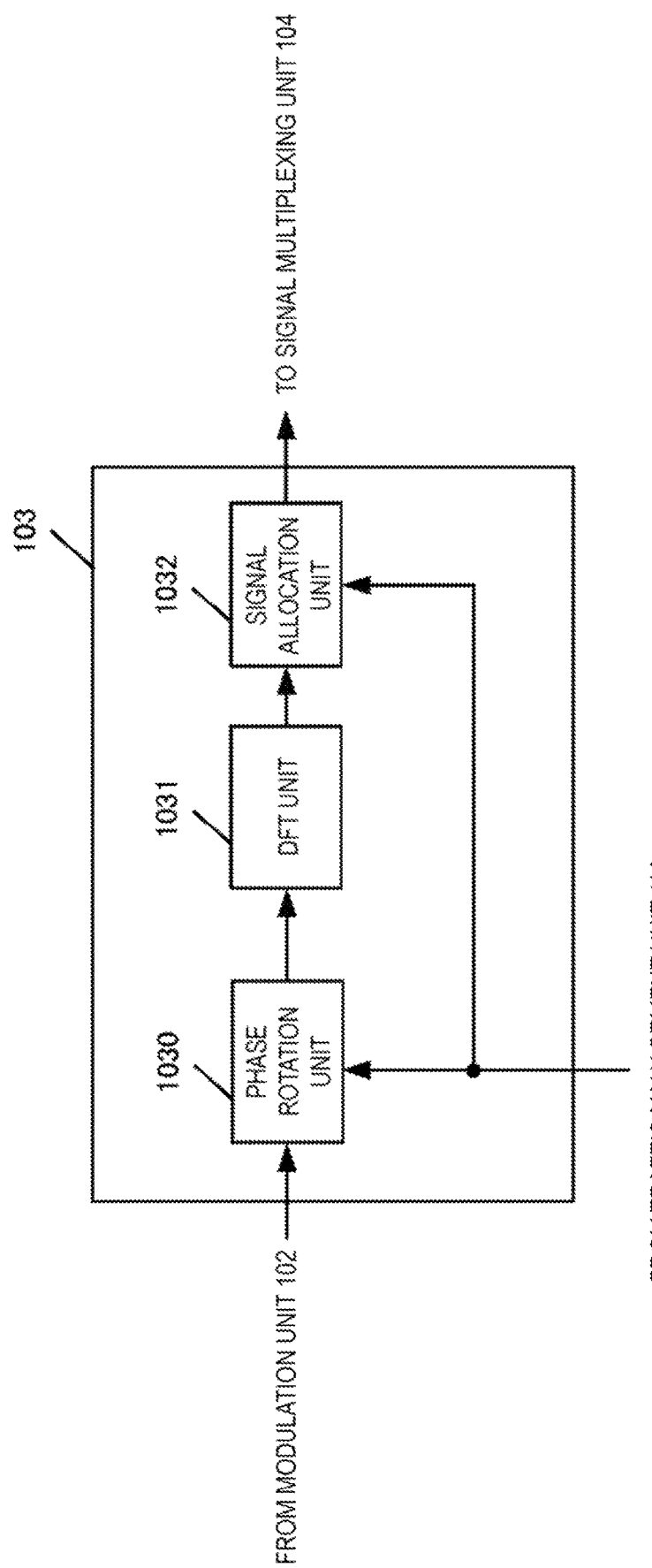
FIG. 8 is a diagram illustrating an example of a configuration of the transmit signal generation unit 103 according to the present embodiment.

In an example of the configuration of the transmit signal generation unit 103 illustrated in FIG. 8, a phase rotation unit 1030 applies phase rotation to the input modulation symbol. The phase rotation given to the data signal in the time domain in the phase rotation unit 1030 adopts a pattern input from the traffic management unit 114 to apply a different pattern to each terminal apparatus. Examples of the phase rotation pattern include a pattern of the phase rotation different in units of modulation symbol. Assume that the phase rotation pattern input from the traffic management unit 114 is shared between the terminal apparatus and the base station apparatus through being notified with the UL Grant, or notified in advance with the configuration control information. The DFT unit 1031 and the signal allocation unit 1032 are the same as those in FIG. 7 and the descriptions thereof are omitted. Here, FIG. 8 illustrates the example in which the phase rotation is given to the data signal in the time domain, but a different method may be used to obtain the same effect. For example, the signal in the frequency domain obtained by the DFT unit 1031 may be given a cyclic delay different for each terminal apparatus. Specifically, in a case that the signals in the frequency domain with no cyclic delay in the terminal apparatus 20-$u$ are $S_U(1)$, $S_U(2)$, $S_U(3)$, and $S_U(4)$, the cyclic delay, having a delay amount of one symbol is given to the terminal apparatus 20-$i$ to obtain $S_i(4)$, $S_i(1)$, $S_i(2)$, and $S_i(3)$, for example.

Figure 9:
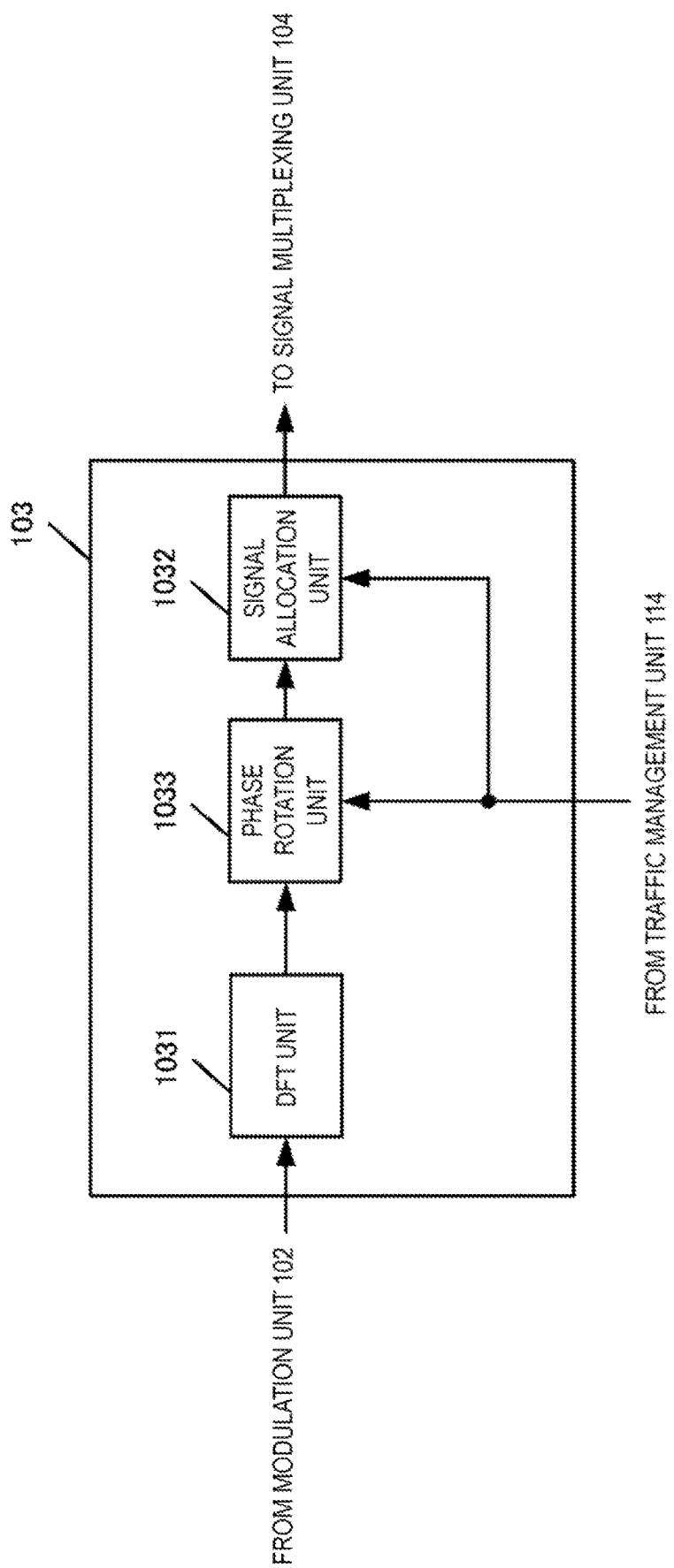
FIG. 9 is a diagram illustrating an example of a configuration of the transmit signal generation unit 103 according to the present embodiment.

The DFT unit 1031 and the signal allocation unit 1032 in FIG. 9 are the same as those in FIG. 7 and the descriptions are omitted. A phase rotation unit 1033 applies the phase rotation to the data signal in the frequency domain obtained by the DFT unit 1031. The phase rotation given to the data signal in the frequency domain in the phase rotation unit 1033 adopts a pattern input from the traffic management unit 114 to apply a different pattern to each terminal apparatus. Examples of the phase rotation include a phase rotation different in units of data signal in the frequency domain (in units of subcarrier). Assume that the phase rotation pattern input from the traffic management unit 114 is information shared between the terminal apparatus and the base station apparatus through being notified with the UL Grant, or notified in advance with the configuration control information. Here, FIG. 9 illustrates the example in which the phase rotation is given to the data signal in the frequency domain, but a different method may be used to obtain the same effect. For example, a cyclic delay different for each terminal apparatus may be given to the modulation symbol before conversion into the frequency domain signal by the DFT unit 1031. Specifically, in a case that the signals in the time domain with no cyclic delay in the terminal apparatus 20-$u$ are $s_U(1)$, $s_U(2)$, $s_U(3)$, and $s_U(4)$, the cyclic delay having a delay amount 1 is given to the terminal apparatus 20-$i$ to obtain $s_i(4)$, $s_i(1)$, $s_i(2)$, and $s_i(3)$. Both the phase rotation unit 1030 and the phase rotation unit 1033 in FIG. 8 and FIG. 9 may be used. The transmit signal generation unit 103 in each of FIG. 7 to FIG. 9 inputs the transmit signal to the signal multiplexing unit 104.

Figure 10:
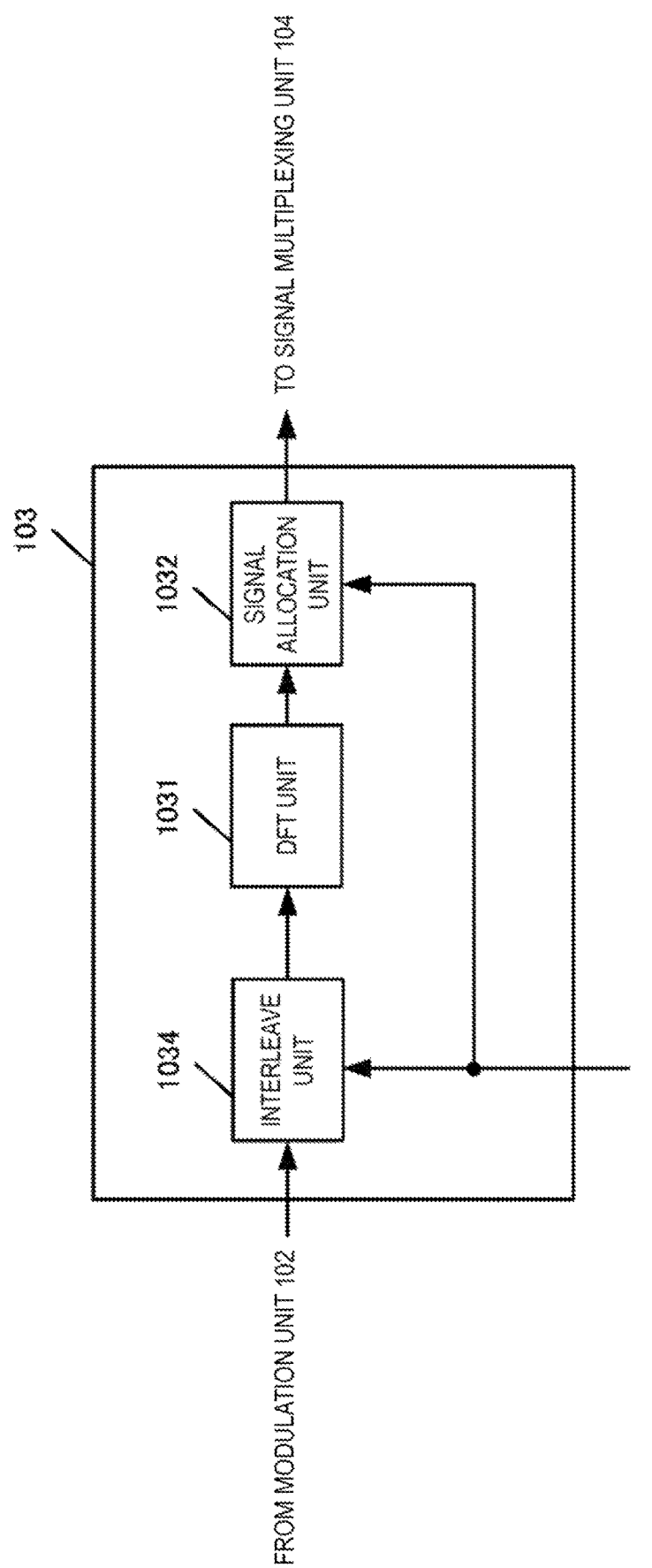
FIG. 10 is a diagram illustrating an example of a configuration of the transmit signal generation unit 103 according to the present embodiment.

The configuration of the transmit signal generation unit 103 may be the configuration illustrated in FIG. 10. In this example, the transmit signal generation unit 103 interleaves (rearranges) the input modulation symbol previous to the DFT unit 1031 (in an interleave unit 1034). In a case of interleaving the modulation symbol, the interleaving is performed such that a sequence is different for each terminal apparatus. The embodiment is not limited to the example illustrated in FIG. 10, which uses the interleaving such that a sequence is different for each terminal apparatus, and uses interleaving in which the coded bit sequence obtained by the error correction coding unit 101 may be rearranged to a different sequence for each terminal apparatus. In a case of the data transmission at the lower coding rate using the spreading code, interleaving may be used in which a sequence is rearranged to be different for each terminal apparatus after applying the spreading code, or the interleaving may be used in which a sequence is rearranged to be different for each terminal apparatus before applying the spreading code.

Figure 11:
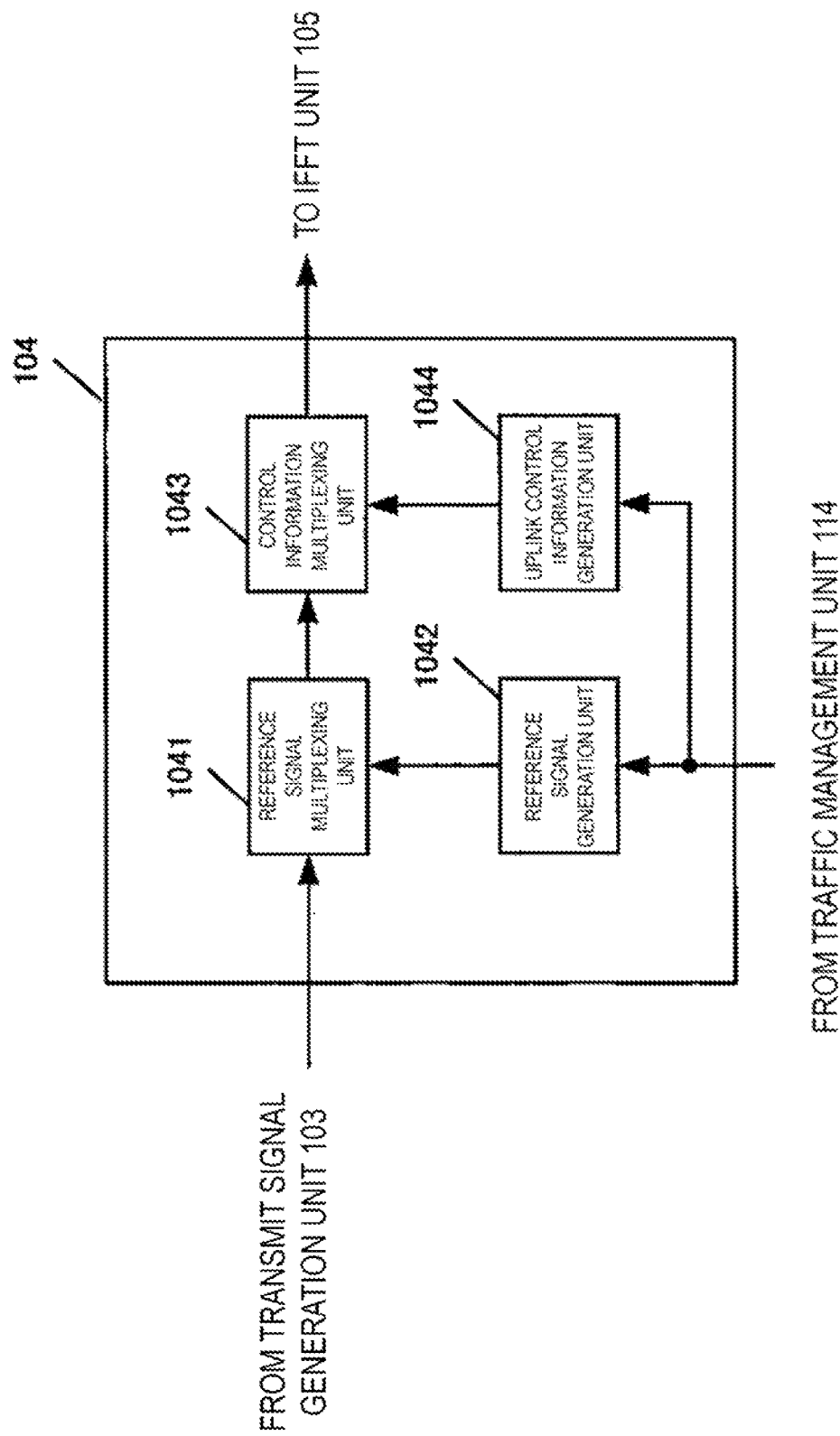
FIG. 11 is a diagram illustrating an example of a configuration of a signal multiplexing unit 104 according to the present embodiment.

FIG. 11 illustrates an example of a configuration of the signal multiplexing unit 104 according to the present embodiment. The transmit signal input from the transmit signal generation unit 103 is input to a reference signal multiplexing unit 1041. The traffic management unit 114 inputs a parameter for generating a reference signal to a reference signal generation unit 1042, and the control information transmitted to the base station apparatus is input to a control information generation unit 1044. The reference signal multiplexing unit 1041 multiplexes the input transmit signal and the reference signal sequence (DMRS) generated by the reference signal generation unit. The transmit signal and the DMRS are multiplexed in this way to generate the frame structure in FIG. 4. The frame structure in FIG. 5 is described later. However, in a case of an arrangement in the OFDM symbol different from the data signal as in the frame structure in FIG. 4, the reference signal multiplexing unit 1041 may multiplex the data signal and the reference signal in the time domain.

On the other hand, the control information generation unit 1044 generates Channel State Information (CSI) of the uplink control information, the Scheduling Request (SR), and Acknowledgement/Negative Acknowledgement (ACK/NACK) to be transmitted on a Physical Uplink Control CHannel (PUCCH), and outputs the generated information to a control information multiplexing unit 1043. The control information multiplexing unit 1043 multiplexes the control information on the frame structure including the data signal and the reference signal. The signal multiplexing unit 104 inputs the generated transmission frame to an IFFT unit 105. However, in a case that the terminal apparatus cannot perform simultaneous transmission of the PUSCH and the PUCCH (in a case of not having the Capability of simultaneous transmission), the terminal apparatus transmits only a signal higher in priority in accordance with a predefined signal priority. In a case that the terminal apparatus can perform the simultaneous transmission of the PUSCH and the PUCCH (in a case of having the Capability of simultaneous transmission), but the PUSCH and the PUCCH cannot be simultaneously transmitted because of a short remaining transmit power of the terminal apparatus, the terminal apparatus also similarly transmits only a signal higher in priority in accordance with a predefined signal priority. The signal transmission priority may be a priority different between a contention based radio communication technology the non-contention based radio communication technology. The data to be transmitted may have priority, and a priority of the PUSCH may depend on the priority of data.

The IFFT unit 105 receives the transmission frame in the frequency domain and performs inverse fast Fourier transform on the received transmission frame in units of each OFDM symbol to convert a frequency domain signal sequence into a time domain signal sequence. The IFFT unit 105 inputs the time domain signal sequence to an identification signal multiplexing unit 106. The identification signal generation unit 115 generates a signal to be transmitted on the subframe for the identification signal in FIG. 5 and inputs the generated signal to the identification signal multiplexing unit 106. Details of the identification signal will be described below. The identification signal multiplexing unit 106 multiplexes the time domain signal sequence and the identification signal on the different subframes as in FIG. 5, and inputs the multiplexed signals to the transmit power control unit 107. However, the identification signal may be multiplexed on a different OFDM symbol or different slot in the same subframe as the data signal. The transmit power control unit 107 uses only an open loop transmit power control value, or both an open loop and a closed loop transmit power control value to perform transmit power control, and inputs a signal sequence after the transmit power control to a transmission processing unit 108. The transmission processing unit 108 inserts a CP into the input signal sequence to convert to an analog signal through Digital/Analog (D/A) conversion, and up-converts the signal after the conversion into a radio frequency used for the transmission. The transmission processing unit 108 amplifies the up-converted signal by a Power Amplifier (PA), and transmits the amplified signal via a transmit antenna 109. The terminal apparatus performs the data transmission as described above. A case that the terminal apparatus performs processing illustrated in FIG. 7 in the transmit signal generation unit 103 means that Discrete Fourier Transform Spread Orthogonal Frequency Division Multiplexing (DFTS-OFDM, also referred to as SC-FDMA) signal is transmitted. A case that the terminal apparatus performs processing illustrated in FIG. 8 or FIG. 9 in the transmit signal generation unit 103 means that the signal obtained by applying the phase rotation or the cyclic delay to the DFTS-OFDM is transmitted. A case that the terminal apparatus performs processing illustrated in FIG. 10 in the transmit signal generation unit 103 means that the DFTS-OFDM signal using a terminal apparatus-specific interleave is transmitted. A case that the terminal apparatus does not perform the DFT in the transmit signal generation unit 103, in other words, a case of a configuration in which there is no DFT unit 1031 in any of FIG. 7 to FIG. 10, means that the OFDM signal is transmitted. The terminal apparatus may use, in the transmit signal generation unit 103, any of the above methods, or a different spread method or a different method for generating waveform of a transmit signal.

Figure 12:
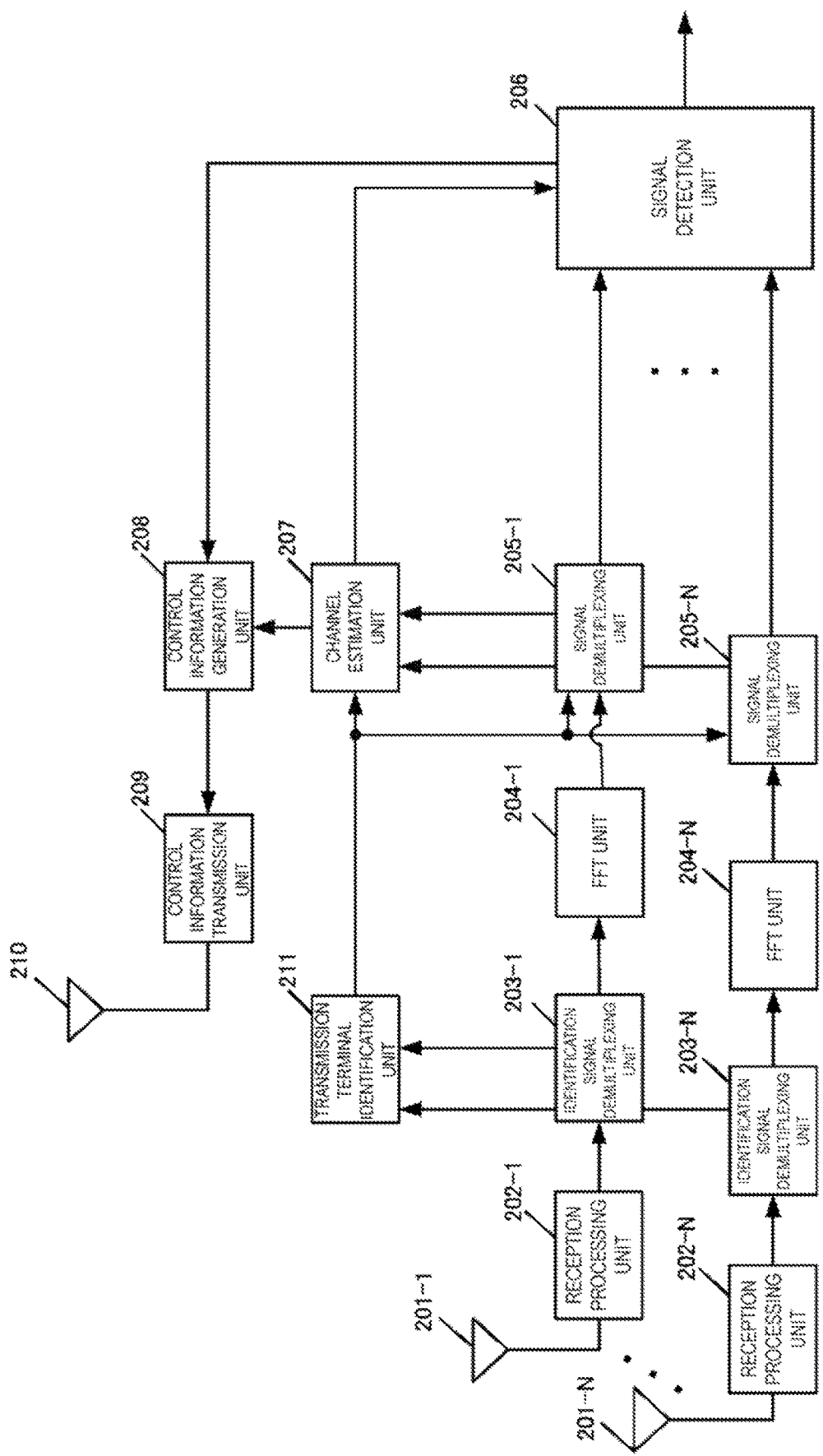
FIG. 12 is a diagram illustrating an example of a configuration of a base station apparatus according to the present embodiment.

FIG. 12 illustrates an example of a configuration of the base station apparatus according to the present embodiment. Referring to FIG. 12, the base station apparatus receives data transmitted by the terminal apparatus via N receive antennas 201-1 to 201-N to input the received data to reception processing units 202-1 to 202-N, respectively. Each of the reception processing units 202-1 to 202-N down-converts the reception signal into a baseband frequency, performs A/D conversion, and removes a CP from the digital signal. The reception processing units 202-1 to 202-N respectively output the signals after the removal of the CP to identification signal demultiplexing units 203-1 to 203-N. The identification signal demultiplexing units 203-1 to 203-N demultiplex the identification signals from the other signals, and output the identification signals to a transmission terminal identification unit 211 and the other signals to FFT units 204-1 to 204-N, respectively. The transmission terminal identification unit 211 identifies the terminal apparatus having performed the data transmission based on the identification signal described later to output information of the transmission terminal apparatus to a channel estimation unit 207 and signal demultiplexing units 205-1 to 205-N. The FFT units 204-1 to 204-N convert the input reception signal sequences from the time domain signal sequences to the frequency domain signal sequences through fast Fourier transform, and output the frequency domain signal sequences to the signal demultiplexing units 205-1 to 205-N, respectively.

Figure 13:
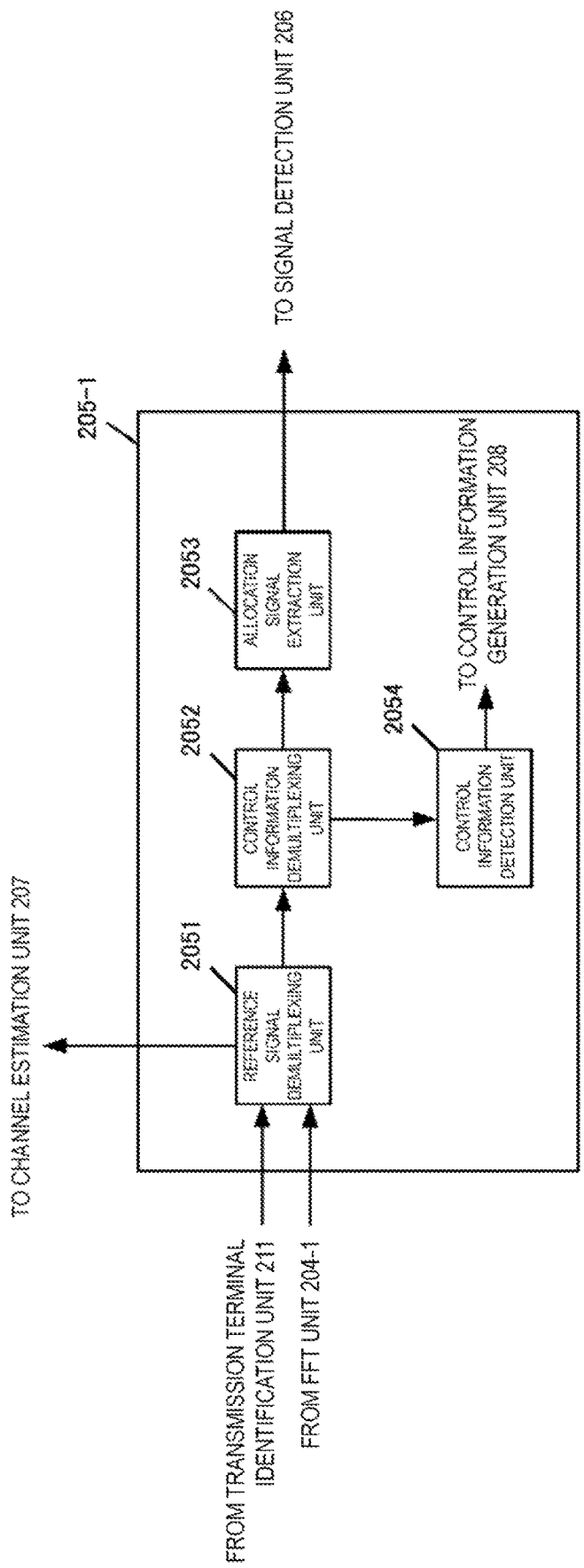
FIG. 13 is a diagram illustrating an example of a configuration of a signal demultiplexing unit 205-1 according to the present embodiment.

The signal demultiplexing units 205-1 to 205-N have a common configuration, and FIG. 13 illustrates an example of the configuration of the signal demultiplexing unit 205-1 according to the present embodiment. Referring to FIG. 13, in the signal demultiplexing unit 205-1, the frequency domain signal sequence is input from the ITT unit 204-1 to a reference signal demultiplexing unit 2051 and the information of the identified transmission terminal apparatus is input from the transmission terminal identification unit 211. The reference signal demultiplexing unit 2051 uses the input information of the transmission terminal apparatus to demultiplex the frequency domain signal sequence into the reference signal and the other signals, and outputs the reference signal to the channel estimation unit 207 and the other signals to a control information demultiplexing unit 2052. The control information demultiplexing unit 2052 demultiplexes the input signal into a control signal and a data signal, and outputs the control signal to a control information detection unit 2054 and the data signal to an allocation signal extraction unit 2053. The control information detection unit 2054 detects the signal transmitted on the PUCCH, and outputs, to a control information generation unit 208, the SR used for the uplink scheduling, the CSI used for the downlink scheduling, and the ACK/NACK used for re-transmission control of the downlink transmission. On the other hand, the allocation signal extraction unit 2053 extracts the transmit signal for each terminal apparatus based on the resource allocation information notified to the terminal apparatus with the control information.

The channel estimation unit 207 receives the De-Modulation Reference Signal (DMRS) that is the transmitted reference signal being multiplexed with the data signal, and the information of the identified transmission terminal apparatus, estimates a frequency response, and outputs the frequency response estimated for demodulation to a signal detection unit 206. The channel estimation unit 207, in a case of receiving a Sounding Reference Signal (SRS), estimates a frequency response to be used in the next scheduling. The control information generation unit 208 performs the uplink scheduling and Adaptive Modulation and Coding (also referred to as link adaptation), based on the frequency responses estimated using the DMRS and the SRS to generate a transmission parameter used by the terminal apparatus for the uplink transmission, and transforms into a DCI format. The control information generation unit 208, in a case that information on whether or not the received data signal includes an error is input from the signal detection unit 206, generates the control information for notifying of an ACK/NACK in the uplink transmission. Here, the ACK/NACK in the uplink transmission is transmitted on at least one of a Physical HARQ CHannel (PHICH), the PDCCH, and the EPDCCH. A control information transmission unit 209 receives the converted control information input from the control information generation unit 208, and allocates the input control information to the PDCCH or the EPDCCH to transmit the input control information to the terminal apparatuses.

Figure 14:
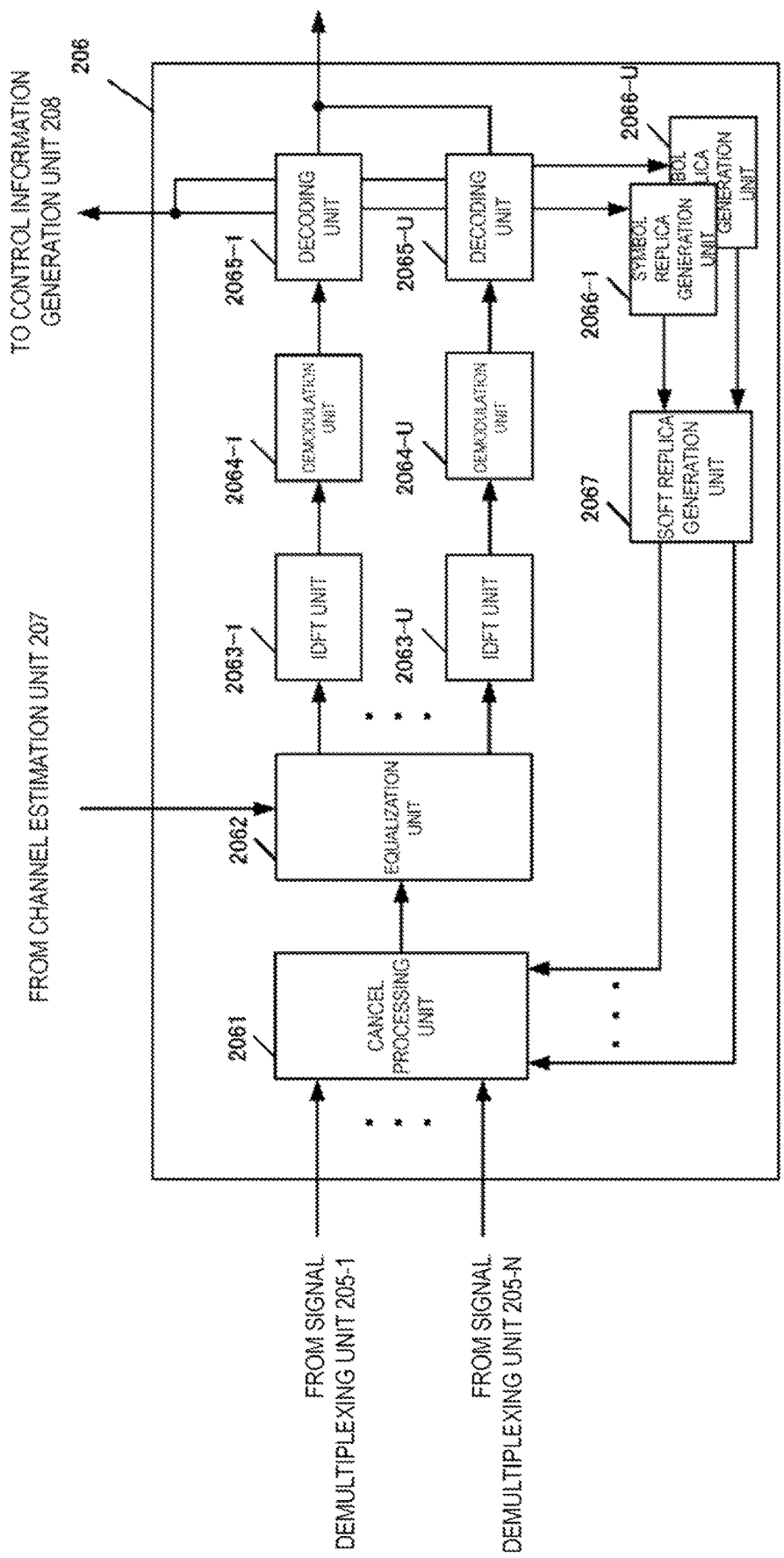
FIG. 14 is a diagram illustrating an example of a configuration of a signal detection unit 206 according to the present embodiment.

FIG. 14 illustrates an example of a configuration of the signal detection unit 206 according to the present embodiment. In the signal detection unit 206, the signal for each terminal apparatus extracted by each of the signal demultiplexing units 205-1 to 205-N is input to a cancel processing unit 2061. The cancel processing unit 2061 receives a soft replica input from a soft replica generation unit 2067, and performs cancel processing on each reception signal. An equalization unit 2062 generates equalization weights based on an MMSE rule by using the frequency response input from the channel estimation unit 207 to multiply the equalization weights by the signal after soft cancelling. The equalization unit 2062 outputs the signal for each terminal apparatus after the equalization to each of IDFT units 2063-1 to 2063-U. Each of the IDFT units 2063-1 to 2063-U converts the reception signal after the equalization in the frequency domain into a time domain signal. Note that, in a case that the terminal apparatus applies the cyclic delay, the phase rotation, or the interleaving on the signal before or after the DFT in the transmission processing, processing for restoring from the cyclic delay, the phase rotation, or the interleaving is applied to the reception signal after the equalization in the frequency domain or the time domain signal. Each of demodulation units 2064-1 to 2064-U receives information of a modulation scheme which is not illustrated but notified in advance or which is predefined, and applies demodulation processing on the reception signal sequence in the time domain to obtain a bit sequence of Log Likelihood Ratio (LLR), in other words, an LLR sequence.

Each of the decoding units 2065-1 to 2065-U receives information of the coding rate which is not illustrated but notified in advance or which is predefined, and applies the decoding processing on the LLR sequence. Here, in order to perform the cancel processing of the Successive Interference Canceller (SIC), the Parallel Interference Canceller (PIC), the turbo equalization, and the like, the decoding units 2065-1 to 2065-U output external LLRs or posteriori LLRs of decoder output to symbol replica generation units 2066-1 to 2066-U, respectively. A difference between the external LLR and the posteriori LLR is whether to subtract a priori LLR input to each of the decoding units 2065-1 to 2065-U from a decoded LLR. In a case that the terminal apparatus applies, on the coded bit sequence after the error correction coding, the puncturing (culling), the interleaving, or the scrambling in the transmission processing, the signal detection unit 206 applies, on the LLR sequence input to each of the decoding units 2065-1 to 2065-U, depuncturing (inserting 0 into a culled bit deinterleaving (restoring from rearrangement), or descrambling. Each of the symbol replica generation units 2066-1 to 2066-U generates a symbol replica from the input LLR sequence in accordance with the modulation scheme used for data transmission by the terminal apparatus, and outputs the generated symbol replica to the soft replica generation unit 2067. The soft replica generation unit 2067 converts the input symbol replica into a signal in the frequency domain by DFT, and multiplies the converted signal by the frequency response to generate the soft replica. Each of the decoding units 2065-1 to 2065-U makes a hard decision on the decoded LLR sequence in a case the number of iterations of the processing of the SIC or PIC and the turbo equalization reaches a prescribed number, determines whether or not an error bit is present in the Cyclic Redundancy Check (CRC), and outputs information on whether or not the error bit is present to the control information generation unit 208. In a case of signal detection by the SIC, ordering processing may be used which performs detection from a high reception quality signal of the terminal apparatus without the iteration processing. In a case of signal detection by the PIC, the iteration processing may be adopted. Here, in a case that the data transmitted at the lower coding rate using the spreading code is received, the signal detection unit 206 performs despreading. Each of the symbol replica generation units 2066-1 to 2066-U generates a symbol replica in accordance with the spreading code and modulation scheme used by the terminal apparatus.

Figure 15:
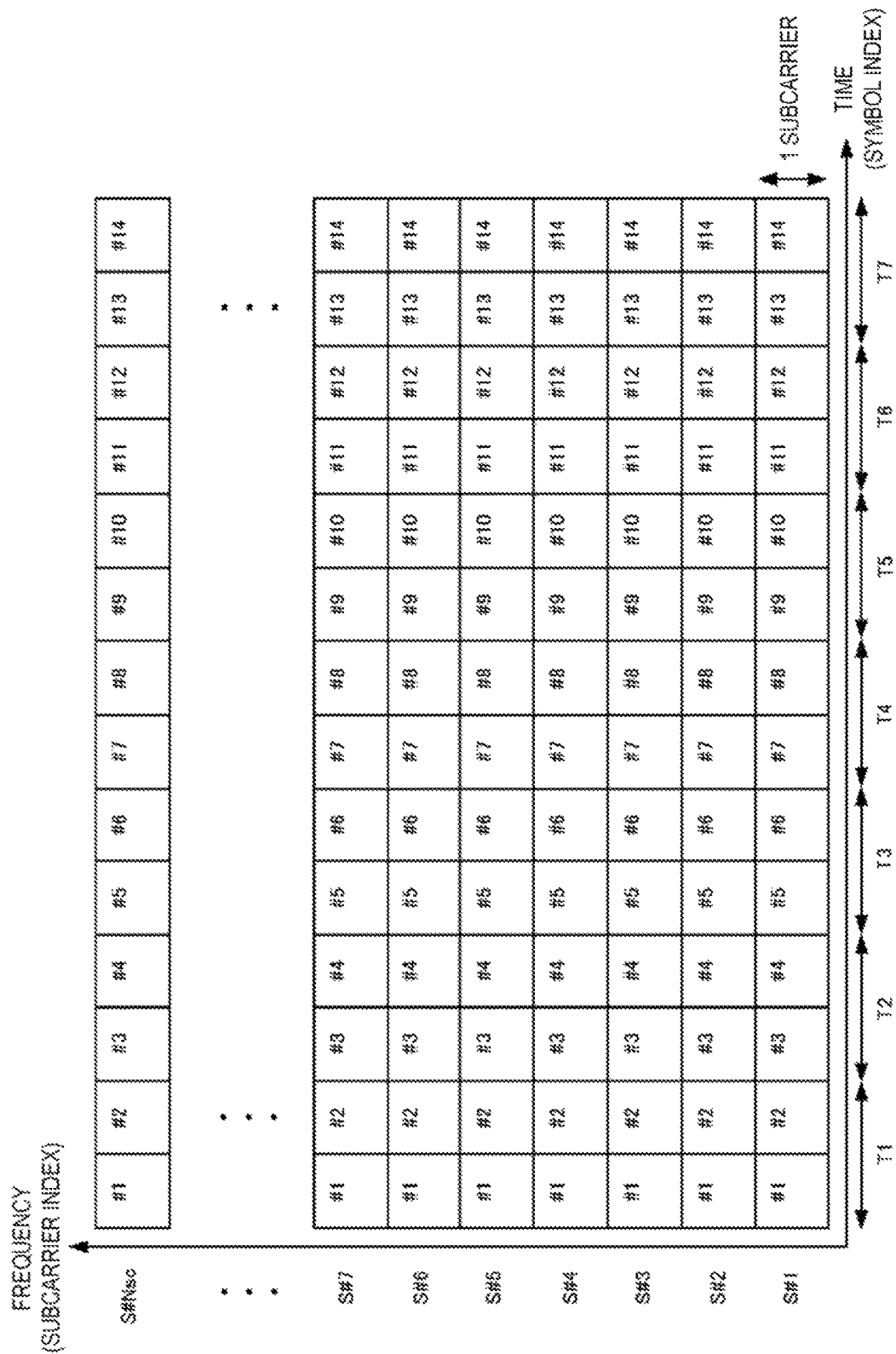
FIG. 15 is a diagram illustrating an example of a configuration of an identification signal of a transmission terminal apparatus according to the present embodiment.

FIG. 15 illustrates an example of a configuration of the identification signal of the transmission terminal apparatus according to the present embodiment. Here, assume that the number of OFDM symbols which can be used to transmit the identification signal is $N_{OFDM}$, and the number of subcarriers which can be used to transmit the identification signal is $N_{SC}$. Furthermore, the number of OFDM symbols used to transmit the identification signal by each transmission terminal is $T_{OFDM}$, and in a case that an Orthogonal Cover Code (OCC) is used in a time direction, an OCC sequence having a length $T_{OCC}$ is used. However, the OCC sequence length has a value in a range of $1 \leq T_{OCC} \leq T_{OFDM}$, and information of the sequence length of the OCC used between the transmission and/or reception devices may be shared in advance. Assume that the number of subcarriers used to transmit identification signal by each transmission terminal apparatus is $T_{SC}$. In a case that Cyclic Shift (CS) is used in a frequency direction, the number of CS patterns $T_{CS}$ is used, and in a case that Interleaved Frequency Division Multiple Access (IFDMA) is used, the number of multiplex patterns $T_{RF}$ is used. Therefore, the number of orthogonal resources for the identification signal is $(N_{OFDM}/T_{OFDM}) \times T_{OCC} \times (N_{SC}/T_{SC}) \times T_{CS} \times T_{RF}$. FIG. 15 illustrates a case that the time or frequency resource capable of transmitting the identification signal is one subframe ($N_{OFDM}=14$), the number of subcarriers is $N_{SC}$, and $T_{OFDM}=T_{OCC}=2$, but the present invention is not limited to this example. The case of FIG. 15 means that, in a case that $N_{SC}=T_{SC}=48$ and $T_{CS}=12$, $T_{RF}=2$, the number of orthogonal resources is 336. The configuration control information transmitted by the base station apparatus includes information indicating the orthogonal resource which transmits the identification signal. OFDM symbol sets T1 to T7 are defined for each continuous 2 OFDM symbols transmitting the identification signal as in FIG. 15, where an index of the OFDM symbol set to be actually used is denoted by $I_T$, and in a case of $N_{SC} > T_{SC}$, X pieces of information F1 to FX of subcarrier sets to be used are defined, an index of a subcarrier set to be actually used is denoted by $I_F$, an index of an OCC sequence to be used is denoted by $I_{OCC}$, a CS pattern to be used is denoted by $I_{CS}$, and a multiplex pattern of the IFDMA to be used is denoted by $I_{RF}$. In this case, the configuration control information transmitted by the base station apparatus includes information uniquely indicating $I_T$, $I_F$, $I_{OCC}$, $I_{CS}$, $I_R$). The configuration control information may be information including only a part of ($I_T$, $I_F$, $I_{OCC}$, $I_{CS}$, $I_{RF}$). However, the OFDM symbol set may not be continuous OFDM symbols, and may be a combination such as of the OFDM symbol #1 and the OFDM symbol #8. Moreover, the subcarrier set may not be continuous subcarriers, and multiple identification signal clusters may be discontinuously used on a frequency axis, for example, the number of identification signal clusters may be integral multiple of $T_{RF}$. The subcarriers S #1 to S # $N_{SC}$ which can be used to transmit the identification signal may be the same as or different from the subcarriers for the data transmission. In a case that the subcarrier which can be used to transmit the identification signal is different from the subcarrier for the data transmission, the subcarrier to transmit the identification signal may only partially overlap the subcarrier to transmit the data signal. In a case that the number of terminal apparatuses accommodated by the base station apparatus exceeds the number of orthogonal resources for the identification signal, the same orthogonal resource needs to be allocated to the different terminal apparatuses in an overlapped manner. In this case, the transmission terminal apparatus is required be identified with a terminal apparatus-specific identifier, in addition to the orthogonal resource for the identification signal. Specifically, the exclusive-OR operation is applied to the CRC added to the data signal with the terminal apparatus-specific ID such as a Cell-Radio Network Temporary Identifier (C-RNTI) and a SPS C-RNTI. With this configuration, the base station apparatus on the reception side performs exclusive-OR operation with multiple identifiers and the CRC after the signal detection by the SIC, the PIC, or the turbo equalization to confirm the identifier in which an error is not detected in the CRC such that the transmission terminal apparatus can be identified.

Figure 16:
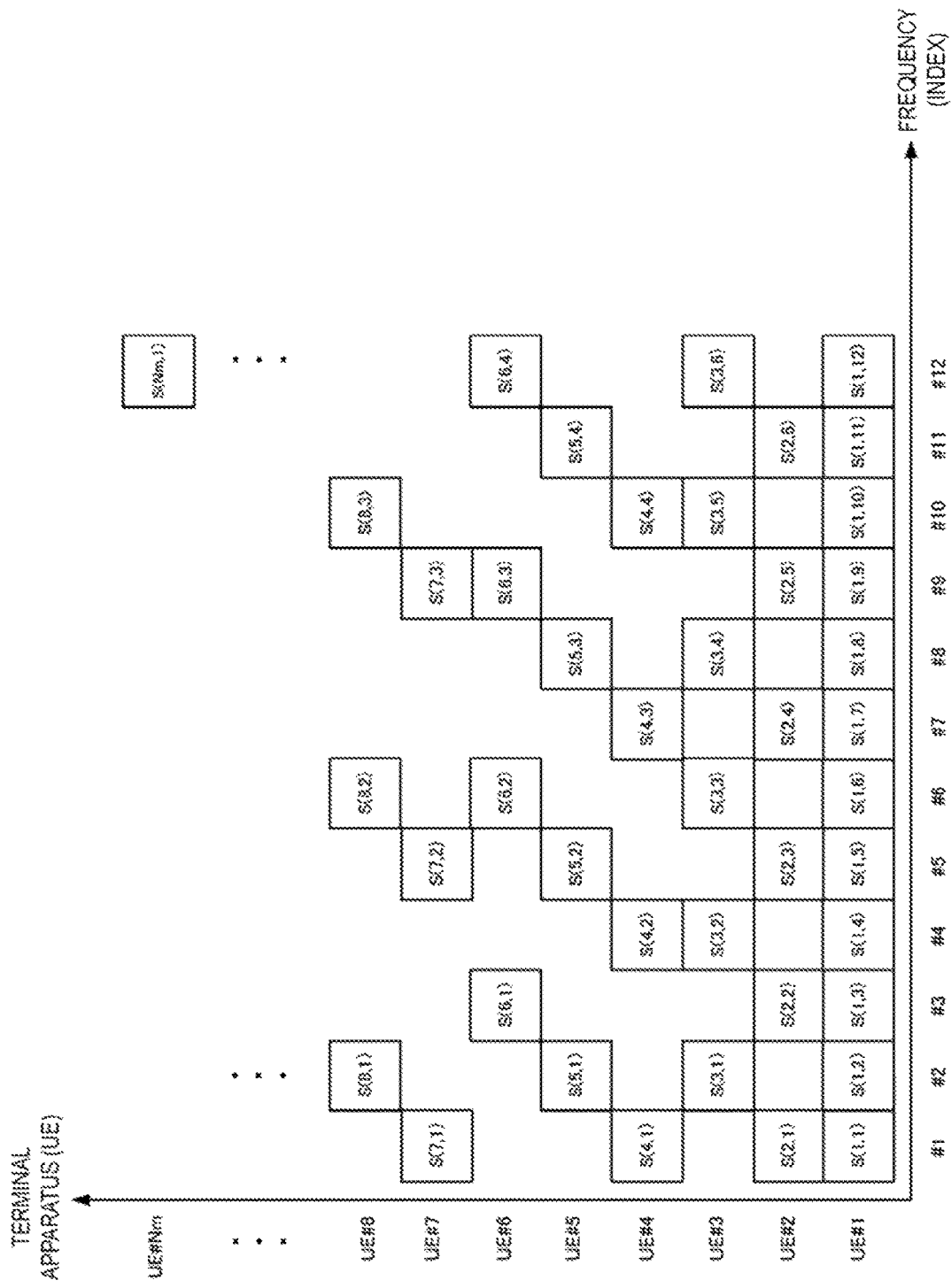
FIG. 16 is a diagram illustrating an example of a frequency resource used for an uplink data transmission according to the present embodiment.

FIG. 16 illustrates an example of a frequency resource used for an uplink data transmission according to the present embodiment. FIG. 16 illustrates an example in which a frequency resource different for each terminal apparatus is used for a frequency resource which can be used for the data transmission using a contention based radio access technology. Hereinafter, a description is given of an example in which a frequency index on a horizontal axis is a subcarrier number. In FIG. 16, there are terminal apparatuses UE #1 to UE # Nm performing the data transmission using a contention based radio access technology, the subcarrier indices which can be used for the data transmission using a contention based radio access technology are #1 to 12, and S(u, i) indicates a signal of the UE # u in the i-th frequency domain. In this example, the UE #1 uses all usable subcarriers to perform the data transmission using the DFTS-OFDM signals, and UE #2 to #8 use the subcarriers discontinuously and at equal intervals to perform the data transmission using the DFTS-OFDM signals. By use of the frequency resource different for each terminal apparatus performing the data transmission using a contention based radio access technology in this way, even in a case that multiple terminal apparatuses perform the data transmission in the same subframe, collision occurs on only some of the frequency resources and an interference amount is small. By use of the subcarriers at equal intervals using the DFTS-OFDM signals, Peak to Average Power Ratio (PAPR) performance is better as compared with the signal allocation at unequal intervals. Particularly, there is a problem in the uplink data transmission that the transmission performance degradation is caused by nonlinear distortion in amplification by the PA and the coverage is narrowed in a case that the transmit power is reduced in back-off for suppressing the non-linear distortion, and thus the data transmission with the good PAPR performance is important. As described above, from a viewpoint of the interference in a case of collision of the data signals transmitted by multiple terminal apparatuses collide and the PAPR performance, the data transmission as illustrated in FIG. 16 is effective.

The description is given assuming that that frequency resources which can be used for the data transmission using a contention based radio access technology includes 12 subcarriers, but the present invention is not limited to this example, and multiple access areas may be provided using 12 subcarriers as one access area. For example, in a case that X access areas are provided, each access area accommodating separate terminal apparatuses, Nm×X terminal apparatuses can be accommodated. In the present invention, the frequency index on the horizontal axis in FIG. 16 is not limited to the subcarrier number, and may be a RB number or a RBG number.

Figure 17:
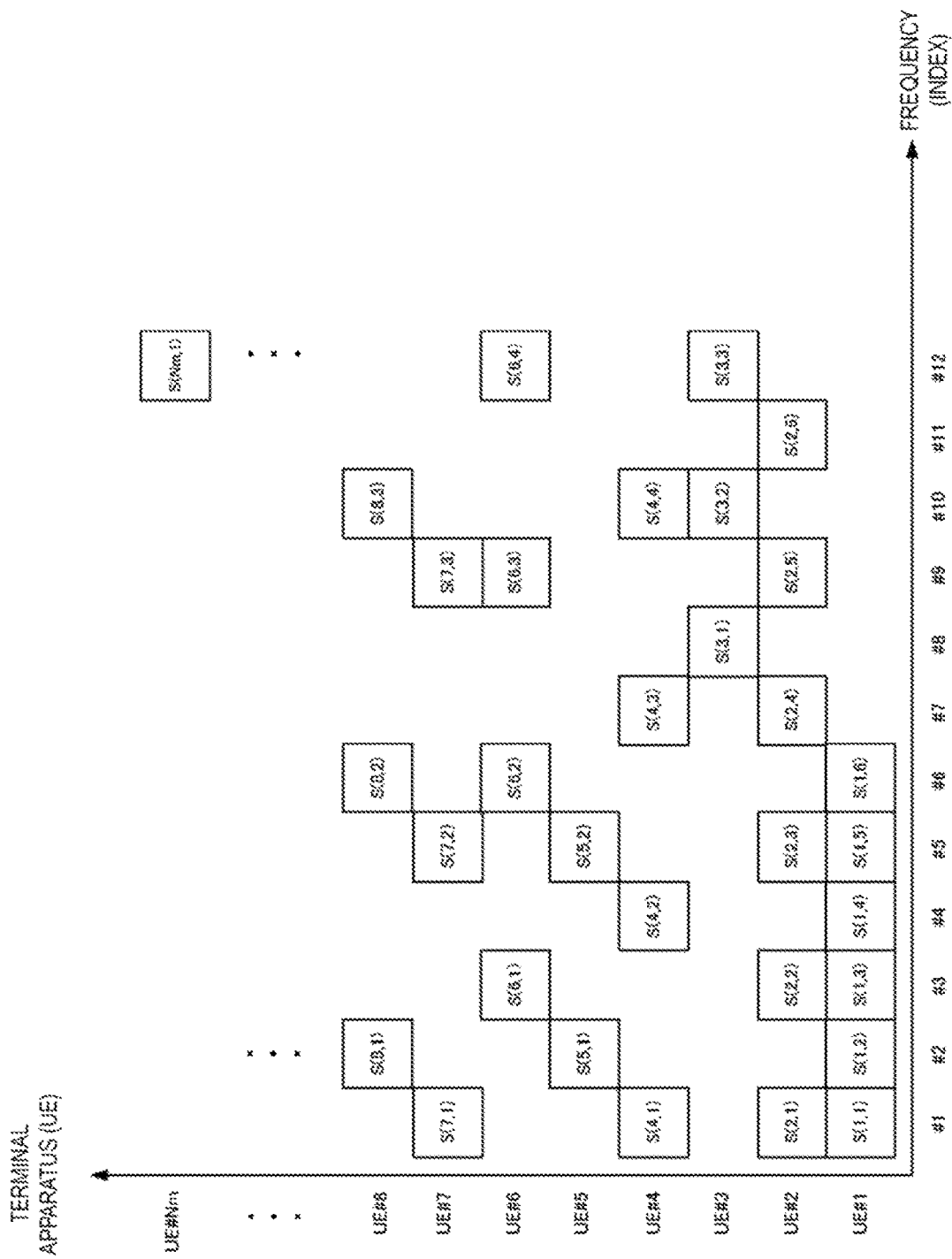
FIG. 17 is a diagram illustrating an example of a frequency resource used for the uplink data transmission according to the present embodiment.

FIG. 17 illustrates an example of a frequency resource used for the uplink data transmission according to the present embodiment. FIG. 17 illustrates an example in which the subcarrier indices #1 to 12 can be used for the data transmission using a contention based radio access technology, while the data is transmitted with the DFTS-OFDM signals being allocated to continuous subcarriers or discontinuous and unequal interval subcarriers in some of the frequency resources. In this example, the subcarriers are divided into the subcarrier indices #1 to 6 and #7 to 12, but a different divisional method may be used. For example, the subcarriers to be used may be divided into three or more, and frequency-division multiplexing may be used together. Each terminal apparatus performs such a data transmission such that the effect similar to FIG. 16 can be obtained from a viewpoint of the PAPR performance, and the interference amount in a case of collision of the data transmitted by multiple terminal apparatuses is smaller than the interference amount in FIG. 16. The description is given assuming that that frequency resources which can be used for the data transmission using a contention based radio access technology includes 12 subcarriers, but the present invention is not limited to this example, and multiple access areas may be provided using 12 subcarriers as one access area. For example, in a case that X access areas are provided, each access area accommodating separate terminal apparatuses, Nm×X terminal apparatuses can be accommodated. In the present invention, the frequency index on the horizontal axis in FIG. 17 is not limited to the subcarrier number, and may be a RB number or a RBG number.

Figure 18:
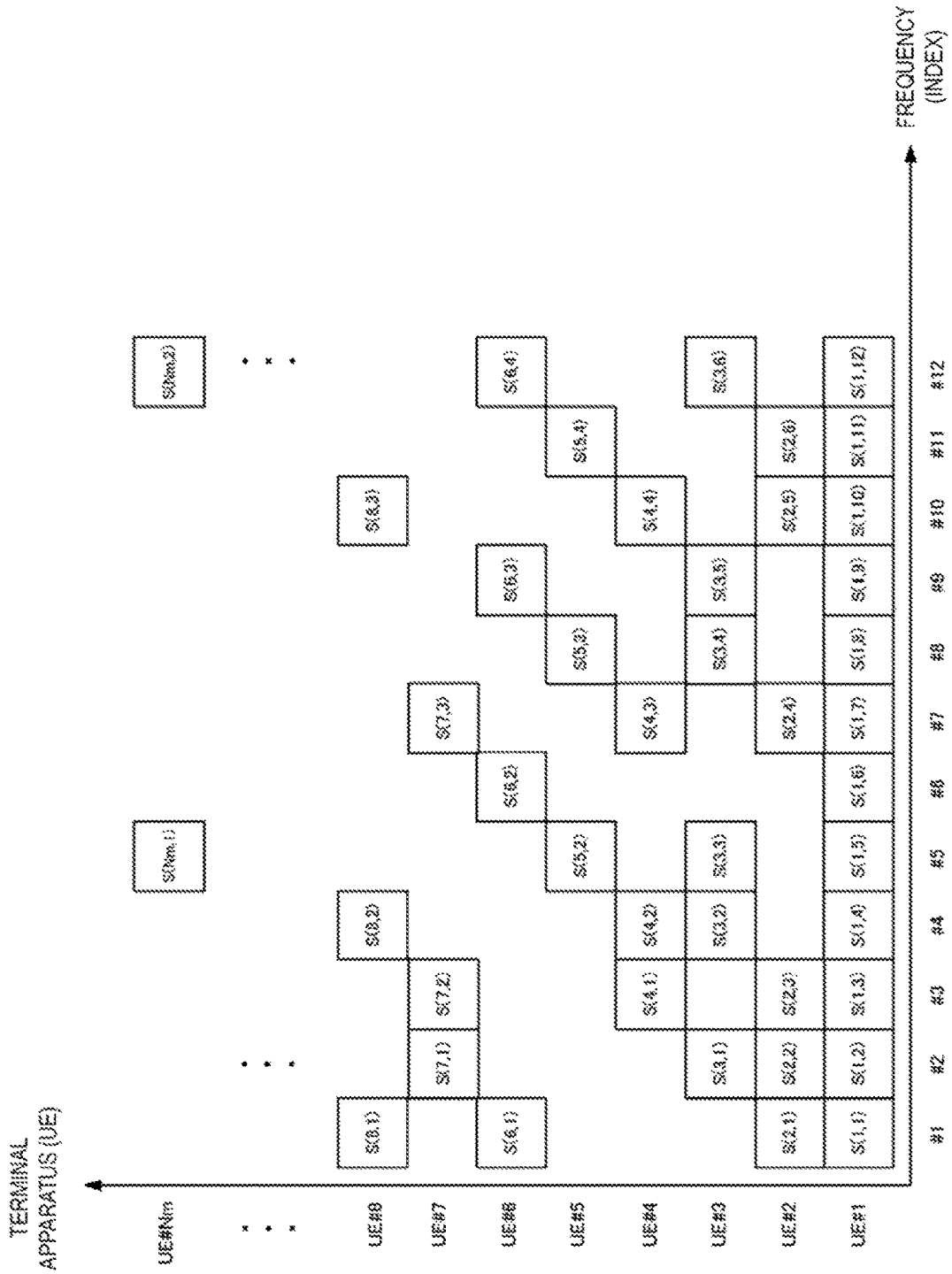
FIG. 18 is a diagram illustrating an example of a frequency resource used for the uplink data transmission according to the present embodiment.

FIG. 18 illustrates an example of a frequency resource used for the uplink data transmission according to the present embodiment. FIG. 18 illustrates an example in which the subcarrier indices #1 to 12 can be used for the data transmission using a contention based radio access technology, while the data is transmitted with the DFTS-OFDM signals being allocated to continuous subcarriers or discontinuous and unequal interval subcarriers. In this example, compared to a case that the data transmission is performed by using the discontinuous and equal interval subcarriers, various methods of using the subcarrier are enabled. Therefore, more allocation patterns of the frequency resource can be provided in a case that the frequency resource different for each terminal apparatus is used, the number of terminal apparatuses which can be accommodated can be significantly increased.

Figure 19:
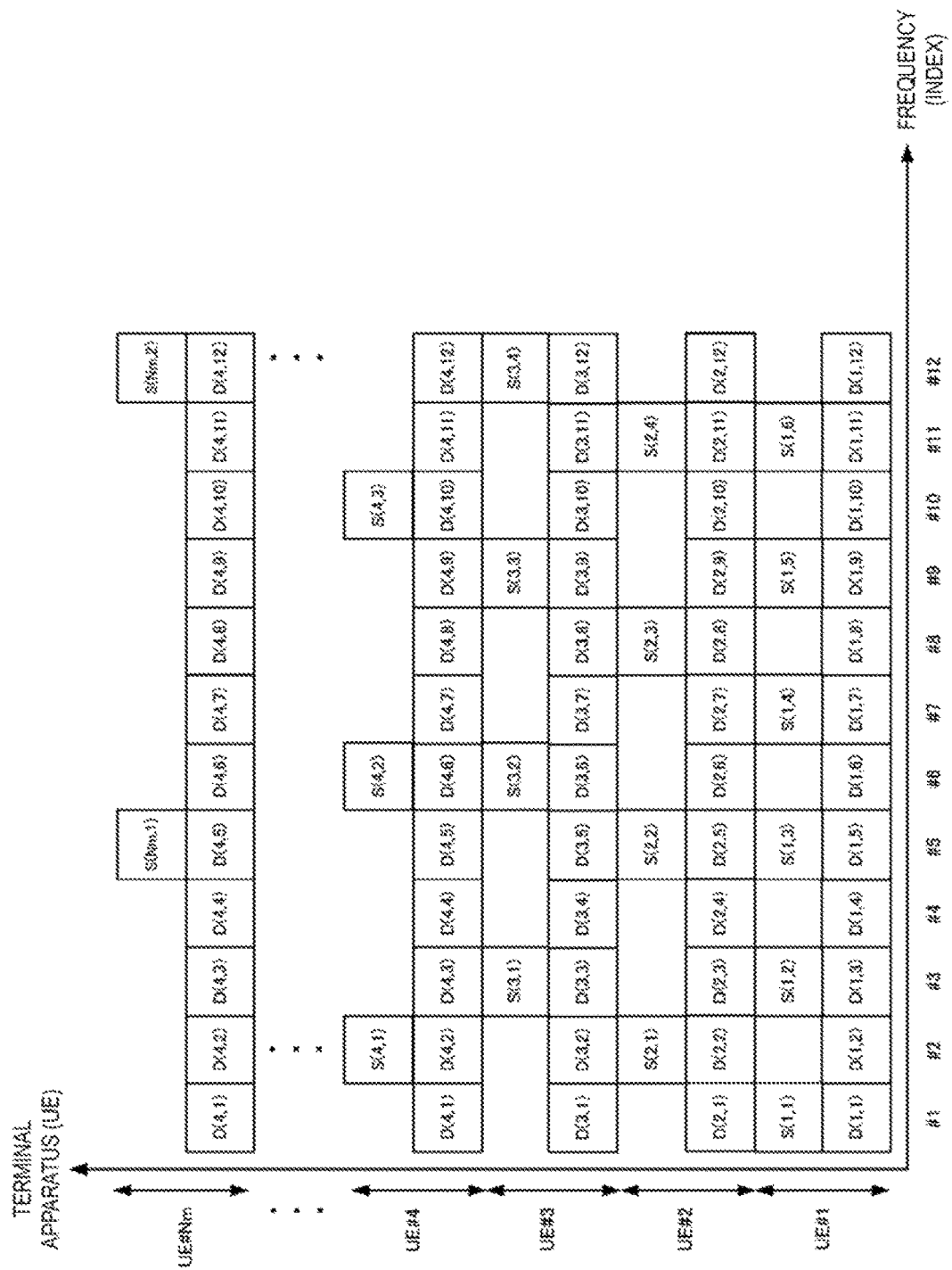
FIG. 19 is a diagram illustrating an example of a frequency resource used for the uplink data transmission and identification signal transmission according to the present embodiment.

FIG. 19 illustrates an example of a frequency resource used for the uplink data transmission and identification signal transmission according to the present embodiment. In FIG. 19, the subcarrier indices which can be used for the data transmission using a contention based radio access technology are #1 to 12, and D(u, i) indicates an identification signal of the UE # u in the i-th frequency domain. In this example, the subcarrier indices #1 to 12 can be used, while the data is transmitted with the DFTS-OFDM signals being allocated to continuous subcarriers or discontinuous and equal interval subcarriers. In this case, even in a case that multiple terminal apparatuses perform the data transmission in the same subframe, collision occurs on only some of the frequency resources, and DMRS orthogonalization is problematic. In the DMRS in the related art, orthogonalization is realized using the CS on the premise that multiple data signals are collided (multiplexed) on the same frequency resource in single-user MIMO, multi-user MIMO, or the like. However, in the case that the collision occurs on only some of the frequency resources as in FIG. 19, the orthogonalization using the CS cannot be enabled, orthogonalization is made only in the OCC having the sequence length of 2, and the number of terminal apparatuses which can be accommodated is limited to two. For this reason, in the example in FIG. 19, the identification signal and the DMRS are shared. In other words, to achieve channel estimation by using the identification signal, in the frame structure in FIG. 5, the DMRS transmission is not performed at the OFDM symbols #4 and #11 of the data transmission subframe (UL transmission subframe), and the data is arranged to the symbols. Therefore, the number of bits which can be transmitted at one time transmission occasion is increased. In the present embodiment, the terminal apparatus changes in the processing by the signal multiplexing unit 104 in FIG. 11. The reference signal multiplexing unit 1041 and the reference signal generation unit 1042 generate the DMRS and multiplex the data signals, but the identification signal and the DMRS are shared in a contention based (Grant Free) radio communication technology, and thus the reference signal multiplexing unit 1041 and the reference signal generation unit 1042 do nothing. However, in a case that the terminal apparatus uses also the non-contention based radio communication technology, the reference signal multiplexing unit 1041 and the reference signal generation unit 1042 generate the DMRS and multiplex the data signals in transmitting the data by using the non-contention based radio communication technology. In the present embodiment, the base station apparatus changes in processing by the signal demultiplexing units 205-1 to 205-N in FIG. 13. The reference signal demultiplexing unit 2051 demultiplexes the DMRS, but does nothing in a contention based radio communication technology because the identification signal and the DMRS are shared. However, in the case that the terminal apparatus uses also the non-contention based radio communication technology, the reference signal demultiplexing unit 2051 demultiplexes the DMRS in transmitting the data by using the non-contention based radio communication technology.

In the present embodiment, in a case that the collision occurs on only some of the frequency resource as in FIG. 19, the subcarrier used for the identification signal is different from the subcarrier allocated for the data signal. Specifically, the all subcarriers #1 to 12 which can be used for the data transmission using a contention based radio access technology are used for the identification signal, and only some of the subcarriers such as the UE #2 to Nm in FIG. 19 are used for the data signal. The subcarriers used to transmit the identification signal match the UE #1 to Nm as in FIG. 19 such that the orthogonalization using the CS is enabled and the number of terminal apparatuses which can be accommodated can be increased. The description is given assuming that that frequency resources which can be used for the data transmission using a contention based radio access technology includes 12 subcarriers, but the present invention is not limited to this example, and multiple access areas may be provided using 12 subcarriers as one access area. For example, in a case that X access areas are provided, each access area accommodating separate terminal apparatuses, Nm×X terminal apparatuses can be accommodated. In the present invention, the frequency index on the horizontal axis in FIG. 19 is not limited to the subcarrier number, and may be a RB number or a RBG number.

Note that FIG. 19 illustrates the example in which the number of subcarriers used to transmit the identification signal is more than the number of subcarriers used for the data transmission, but the present invention is not limited thereto, and the number of subcarriers used for the identification signal may be less than the number of subcarriers used for the data transmission. Specifically, the subcarriers are divided into #1 to 6 and #7 to 12, and the terminal apparatus uses only the subcarrier #1 to 6 or #7 to 12 to transmit the identification signal. This allows, in the UE #1 in FIG. 19, to the number of subcarriers used for the identification signal be less than the number of subcarriers used for the data transmission. The subcarriers used to transmit the identification signal by the terminal apparatus may be determined depending on the allocation of the subcarriers to transmit the data. For example, in a case that the data transmission is performed using the subcarriers like the UE #5 in FIG. 18, the number of subcarriers for the data transmission is more in the subcarriers #7 to 12 than the subcarriers #1 to 6, and therefore, the identification signal may be transmitted using the subcarriers #7 to 12.

In the present embodiment, by use of a frequency resource different for each terminal apparatus in a contention based radio access technology as described above, even in a case that multiple terminal apparatuses perform the data transmission in the same subframe, collision occurs on only some of the frequency resources and the interference amount is small. By use of the subcarriers at equal intervals using the DFTS-OFDM signals, the PAIR performance is better as compared with the signal allocation at unequal intervals. As a result, improvement of reception quality and improvement of frequency efficiency in the entire system can be achieved, and therefore, a large number of terminals can be efficiently accommodated.

Second Embodiment

In a second embodiment according to the present invention, a description is given of an example in which, in a case that the terminal apparatus performs the data transmission by using some of the OFDM symbols in the subframes for the data transmission, the interference amount is reduced in data transmission by multiple terminal apparatuses by using the same subframe.

Figure 20:
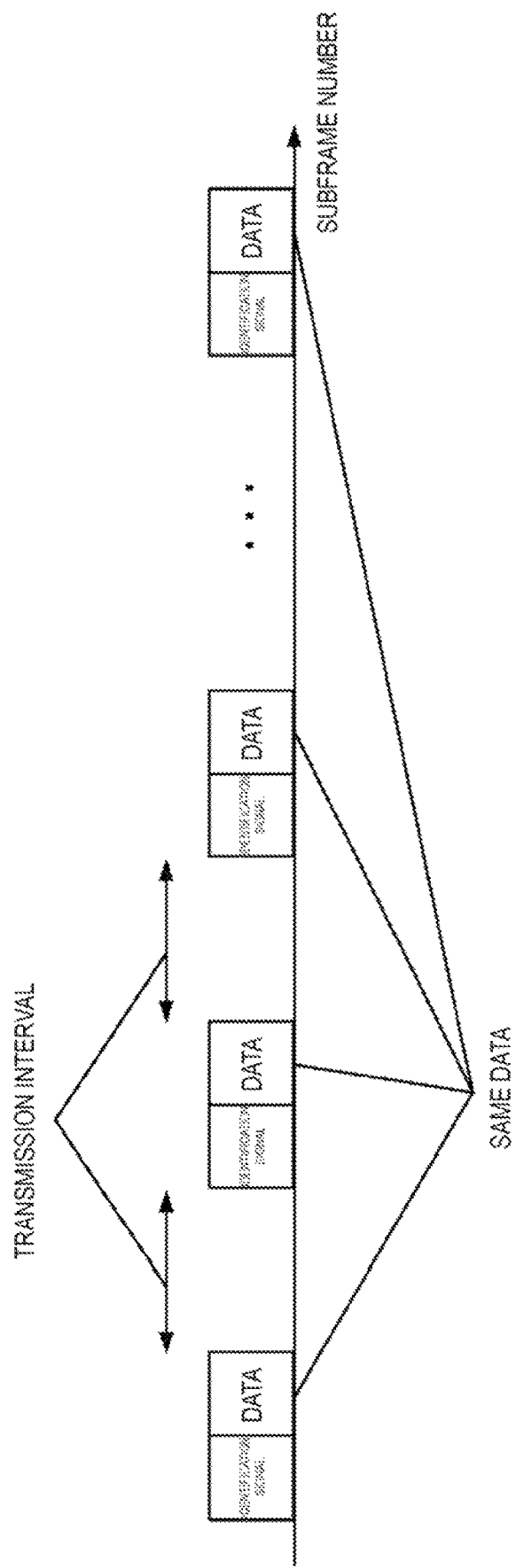
FIG. 20 is a diagram illustrating an example of the uplink identification signal and data transmission according to the present embodiment.
Figure 21:
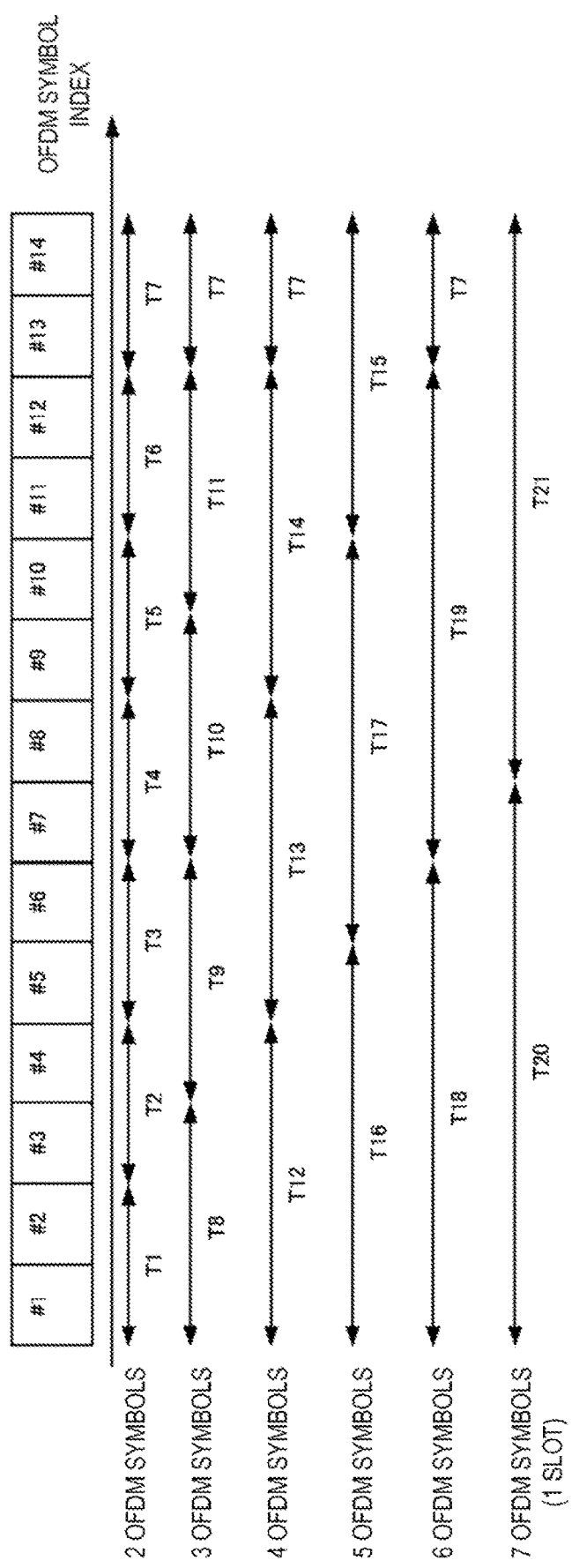
FIG. 21 is a diagram illustrating an example of an uplink data transmission method according to the present embodiment.

In the present embodiment, the configuration example of the terminal apparatus is the same as the configuration of the first embodiment and is illustrated in FIGS. 6, 7, 8, 9, 10, and 11, and the configuration example of the base station apparatus is the same as the configuration of the first embodiment and is illustrated in FIGS. 12, 13, and 14. A sequence chart of the data transmission by the terminal apparatus also the same as the sequence chart in the first embodiment, and is illustrated in FIG. 3. For this reason, in the present embodiment, only the different processing is described and the description of the same processing is omitted. FIG. 20 illustrates an example of the uplink identification signal and data transmission according to the present embodiment. The present embodiment illustrates the example in which the same data is transmitted multiple times, and the identification signal and the data are transmitted at each transmission occasion. In a case that the terminal apparatus performs the data transmission using a contention based radio access technology, a unit for the data transmission within one subframe illustrated in FIG. 21 is divided into T1 to T21, any of which is used. Transmission durations T1 to T7 correspond to a case of the data transmission using only 2 OFDM symbols in one subframe, transmission durations T8 to 11 correspond to a case of the data transmission using only 3 OFDM symbols in one subframe, transmission durations T12 to 15 correspond to a case of the data transmission using only 4 OFDM symbols in one subframe, transmission durations T16 to 17 correspond to a case of the data transmission using only 5 OFDM symbols in one subframe, transmission durations T18 to 19 correspond to a case of the data transmission using only 6 OFDM symbols in one subframe, and transmission durations T20 to 21 correspond to a case of the data transmission using only 7 OFDM symbols (1 slot) in one subframe. In such a case, in a case that the terminal apparatus performs the data transmission using a contention based radio access technology, the data transmissions by multiple terminal apparatuses may collide in only a specific transmission duration. Therefore, the terminal apparatus may change the transmission duration for each data transmission among the number of OFDM symbols used for the data transmission. For example, assuming that the subframe number for the data transmission is 1≤Nf≤10, the number of selectable transmission durations is Nd, a transmission duration offset provided for each terminal apparatus is 0≤Noff≤Nd−1, and a hopping amount of the transmission duration is 0≤Nh≤Nd−1, calculation can be made using mod (Nf×Nh+Noff, Nd)+1. In a case of a data transmission only using 2 OFDM symbols in one subframe, Nd=7, and 1 to 7 are given from the above equation to allow T1 to T7 to be selected. Similarly, in a case of a data transmission only using 3 OFDM symbols in one subframe, Nd=4, and 1 to 4 are given from the above equation to allow T8 to T11 to be selected.

Note that in the case that the terminal apparatus performs the data transmission using a contention based radio access technology, the frequency resource to be used may, be changed for each data transmission to reduce a probability of collision at the same frequency and the same time. To be more specific, the frequency resource to be used may be changed in association with the subframe number for the data transmission of the same data, and for example, the allocation of the frequency resource to be used may be changed depending on the subframe number in the data transmission as in FIG. 19. In a case that the transmitted data is very small in size, application may be simultaneously with some of the OFDM symbols in one subframe (the number of OFDM symbols to be used is 13 or less) for the data transmission, and the data transmission is performed in units of a slot or OFDM symbol in the subframe in a case of using the time or frequency resource different for each terminal apparatus. The frequency resource or the time resource (the slot number or the OFDM symbol) may be changed also in the re-transmission depending on the subframe number or the slot number.

Figure 22:
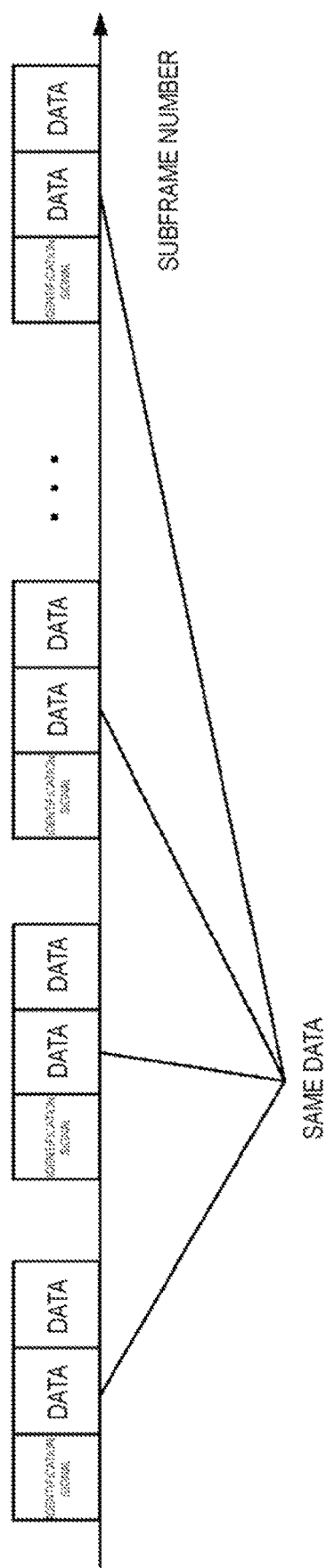
FIG. 22 is a diagram illustrating an example of the uplink data transmission method according to the present embodiment.

Note that the number of subframes used to transmit the identification signal and the data in FIG. 20 may not be the same, for example, one subframe for the identification signal and two subframes for the data transmission may be used as in the example in FIG. 22. In this way, the subframes capable of the data transmission may be increased to reduce the overhead.

The present embodiment is described using an example in which the same data is transmitted multiple times, but the present invention is not limited to this example, and for example, in a case of only one time data transmission also, the time or frequency resource for the data transmission may be changed depending on the subframe number according to the present embodiment.

The present embodiment is described with an example in which the time or frequency resource for the data transmission is changed depending on the subframe number, but the present invention is not limited to this example, and for example, the time or frequency resource for the data transmission may be changed in association with the orthogonal resource for the identification signal and the sequence or orthogonal resource for the DMRS.

Note that the present invention can be also applied to a case that a transmission duration in one subframe is different for each terminal apparatus, and a case that the number of frequency resources used for the data transmission is different for each terminal apparatus.

In the present embodiment, the terminal apparatus changes the time or frequency resource for the data transmission, based on the subframe number in a contention based radio access technology as described above, such that even if multiple terminal apparatuses perform the data transmission in the same subframe, collision occurs on only some of the time or frequency resources and an interference amount is reduced. As a result, improvement of a reception quality and improvement of a frequency efficiency in the entire system can be achieved, and therefore, a large number of terminals can be efficiently accommodated.

Third Embodiment

In a third embodiment according to the present invention, a description is given of an example in which predictive traffic information unique to the terminal apparatus such as a data occurrence frequency and a predicted data amount, is transmitted, and the configuration control information is transmitted based on the predictive traffic information received by the base station apparatus.

Figure 23:
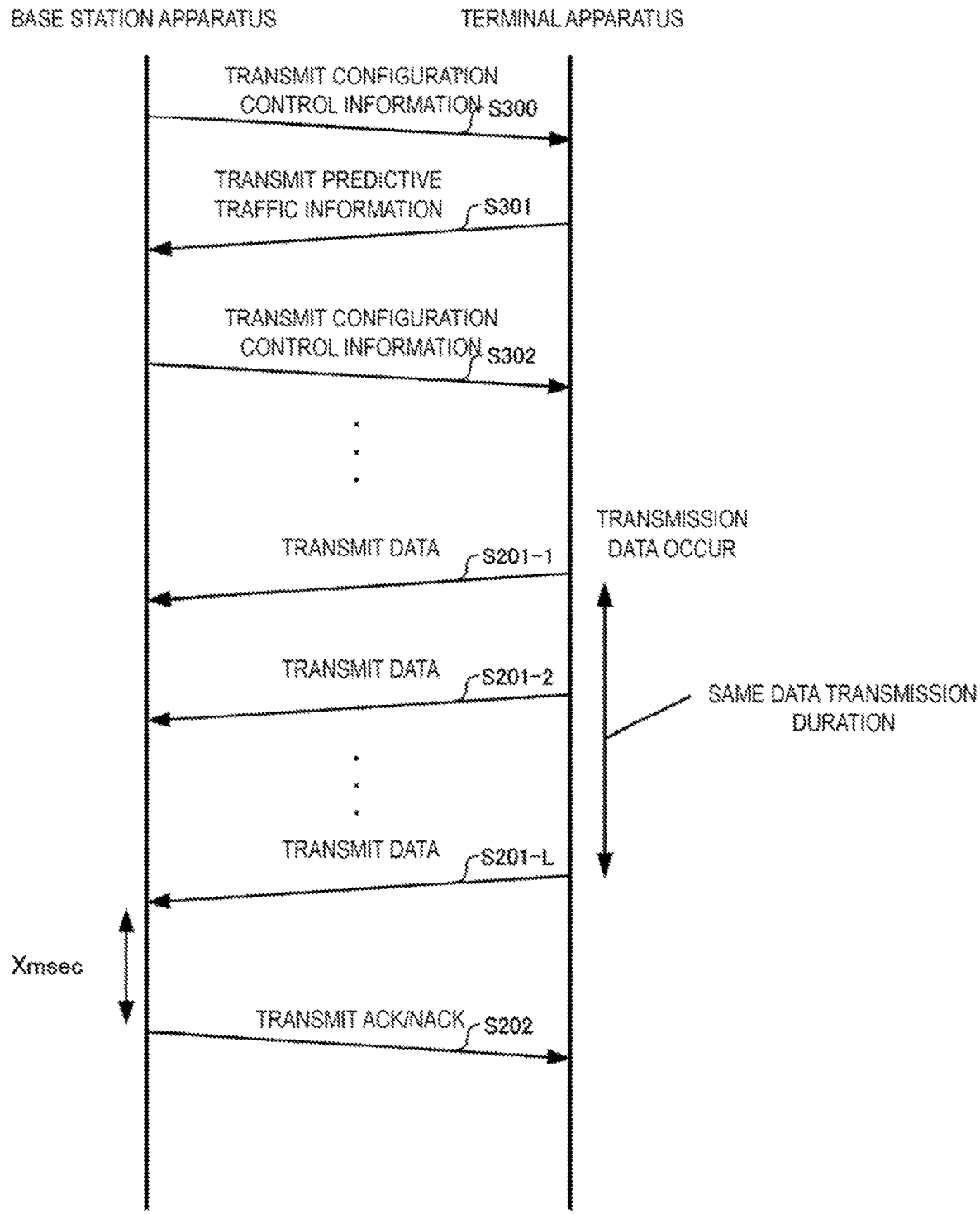
FIG. 23 is a diagram illustrating an example of a sequence chart of the data transmission by the terminal apparatus according to the radio communication technology of the present embodiment.

In the present embodiment, the configuration example of the terminal apparatus is the same as the configuration of the first embodiment and is illustrated in FIGS. 6, 7, 9, 10, and 11, and the configuration example of the base station apparatus is the same as the configuration of the first embodiment and is illustrated in FIGS. 12, 13, and 14. For this reason, in the present embodiment, only the different processing is described and the description of the same processing is omitted. A sequence chart of the data transmission by the terminal apparatus is illustrated in FIG. 23. In FIG. 23, the base station apparatus transmits the configuration control information which is not changed depending on the state, capability, or QoS of the terminal apparatus (S300). Examples include whether to transmit the CSI, whether to transmit the DMRS in the data transmission subframe, and whether to transmit the SRS. Next, the terminal apparatus transmits the predictive traffic information (S301). The predictive traffic information may include a predicted data occurrence frequency (average occurrence period), a transmission data amount (an average or maximum value of a predicted data amount or the like), a required data rate, a reception quality (a required packet error rate), and the like. The terminal apparatus may transmit the Capability and a UE category together with the predictive traffic information. The Capability may include information whether to be able to use the HARQ, information whether to be able to use the closed loop transmit power control value, information whether to be able to use fractional transmit power control, information whether to be able to transmit the SRS, information of the number of transmit and receive antennas and the number of antennas which can be simultaneously used, and the like. The LIE category, includes a data rate (a data rate capable of transmission), a buffer size, and the like supported by the terminal apparatus.

The terminal apparatus may transmit the predictive traffic information not in only one time such as an initial connection or a handover but in multiple times. For example, the terminal apparatus may transmit the predictive traffic information in a case that a change occurs in the predictive traffic information transmitted by the terminal apparatus. For example, a prescribed change amount may be predefined, and in a case that the predicted data occurrence frequency or transmission data amount increases or decreases the prescribed change amount or more, the predictive traffic information may be transmitted. The terminal apparatus may periodically transmit the predictive traffic information.

The base station apparatus, after receiving the predictive traffic information from the terminal apparatus, transmits the configuration control information depending on the received information (S302). Examples include the frequency resource (frequency position, bandwidth), the Modulation and Coding Scheme (MCS), cell-specific and terminal apparatus-specific target receptions, and the like. In a case that the terminal apparatus has multiple transmit antennas, the control information may also include the number of transmission layers (the number of ranks), the MCS for each layer (or for each codeword), and precoding information. Hereinafter, a description is omitted because S201-1 to S202 in FIG. 3 are the same processing as in FIG. 3.

The frequency resource (frequency position, bandwidth) included in the configuration control information transmitted by the base station apparatus, based on the predictive traffic information may be determined for each terminal apparatus. To be more specific, multiple access areas (frequency position, bandwidth) for accommodating the terminal apparatuses by the base station apparatus using a contention based radio communication technology may be provided, and the access area different for each terminal apparatus may be specified. As a method for determining the access area notified to each terminal apparatus, the terminal apparatuses among which the transmission data amount, the required data rate, and transmission quality are similar may be set for the same access area. The base station apparatus may transmit the configuration control information such that the terminal apparatuses accommodated in the same access area are the same in the MCS used for the data transmission. In this case, in a case that the predictive traffic information of the terminal apparatus causes the MCS to be required to be changed, the configuration control information may be transmitted again to change the access area at the same time as the MCS changing.

Note that the terminal apparatus may transmit a Power Headroom (PH) simultaneously with the predictive traffic information or periodically. In this case, the base station apparatus may configure the MCS depending on the PH. The base station apparatus, in a case that the PH transmitted by the terminal apparatus is significantly changed as compared with the previous PH, may transmit the configuration control information for changing the MCS or the access area.

The present embodiment describes the example in which the base station apparatus transmits separately the DMRS information and the MCS information, but the sequence or orthogonal resource for the DMRS associated with the coding rate may be notified.

In the present embodiment, the base station apparatus controls the access area or the MCS based on the predictive traffic information transmitted by the terminal apparatus in a contention based radio communication technology such that the efficient contention based radio communication can be achieved as described above. As a result, improvement of a reception quality and improvement of a frequency efficiency in the entire system can be achieved, and therefore, a large number of terminals can be efficiently accommodated.

Fourth Embodiment

In a fourth embodiment according to the present invention, a description is given of an example in which the terminal apparatus switches whether to apply the spreading code and performs the data transmission by using the discontinuous and equal interval subcarriers (interlacing).

Figure 24:
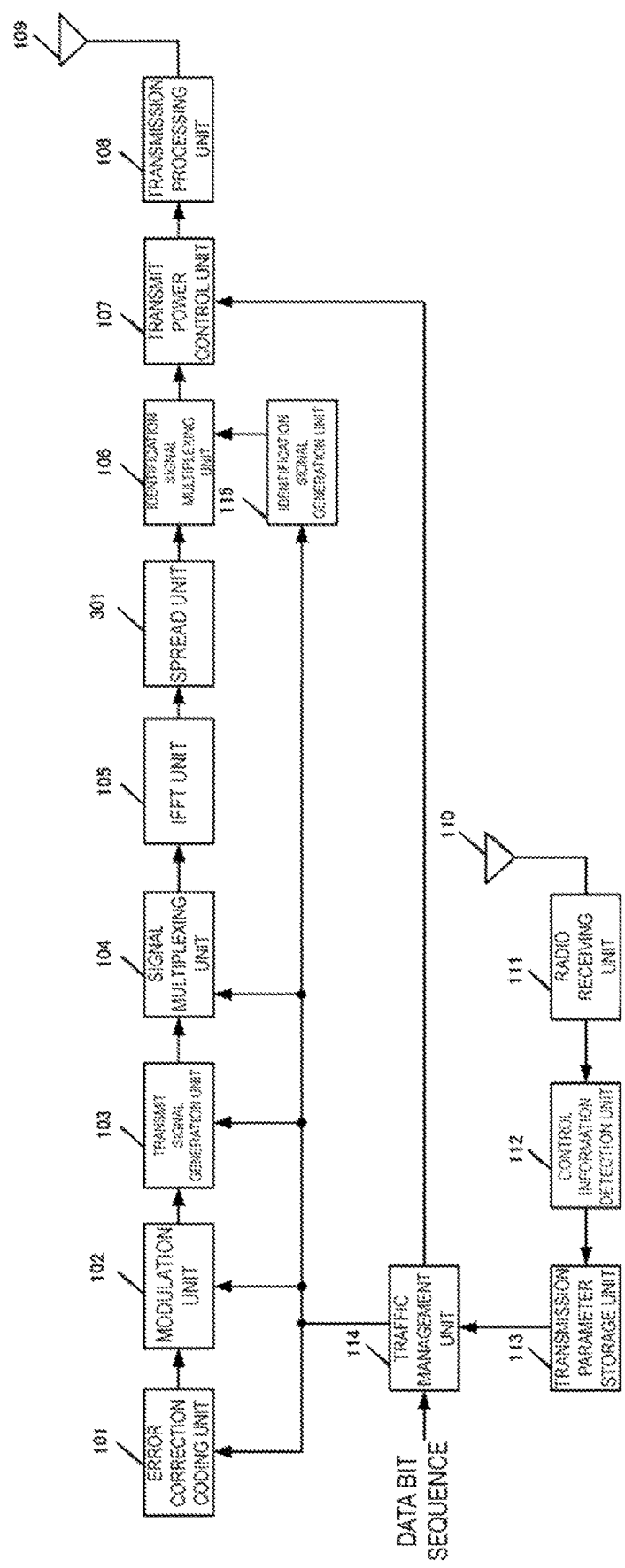
FIG. 24 is a diagram illustrating an example of a configuration of the terminal apparatus according to the present embodiment.

FIG. 24 illustrates an example of a configuration of the terminal apparatus according to the present embodiment. In FIG. 24, the configuration of the blocks is the same as in FIG. 6 except that a spread unit 301 is added. A sequence chart of the data transmission by the terminal apparatus also the same as the sequence chart in the first embodiment, and is illustrated in FIG. 3. Hereinafter, different processing is mainly described and the description of the same processing is omitted. The spread unit 301 receives the time domain signal sequence input from the IFFT unit 105, and applies code spreading in units of an OFDM symbol. However, whether to apply the spreading code is notified in advance as the configuration information by the base station apparatus, and in a case of applying the spreading code, the spread unit 301 performs spread processing. The transmit signal generation unit 103 may have any of the configurations in FIGS. 7 to 10, and includes the signal allocation unit 1032. The signal allocation unit 1032 may use the equal interval subcarriers at an interval different for each terminal apparatus as in FIG. 16, similar to the above embodiments. The continuous subcarriers may be used like the terminal apparatus UE #1. However, in the data transmission using a contention based radio communication technology, all the terminal apparatuses do not always perform the data transmission in the same subframe, and thus there are, as illustrated in FIG. 16, a case that the terminal apparatus UE #1 (using the continuous subcarriers) and the terminal apparatus UE #2 (interlacing (using the discontinuous and equal interval subcarriers)) perform the data transmission in the same subframe, a case that the terminal apparatus UE #2 (using the discontinuous and equal interval in units of 2 subcarriers) and the terminal apparatus UE #4 (using the discontinuous and equal interval in units of 4 subcarrier) perform the data transmission in the same subframe, and the like. Therefore, there may be subframes where any of the terminal apparatuses UE #1 to Nm illustrated in FIG. 16 does not perform the data transmission, subframes where only one of the terminal apparatuses performs the data transmission, or the subframe where two or more terminal apparatuses perform the data transmission. Depending on the required QoS or reception quality, the MCS to be used, the terminal category, the Capability, a Feature Group Indicator (FGI), a terminal type (mMTC terminal, a Ultra-reliable and low latency communications terminal, or a larger capacity and high speed communication (Enhanced mobile broadband) terminal), and the like, the terminal apparatus may be grouped to switch intervals of the interlace or switch the uses between interlacing and using continuous subcarriers.

Figure 25:
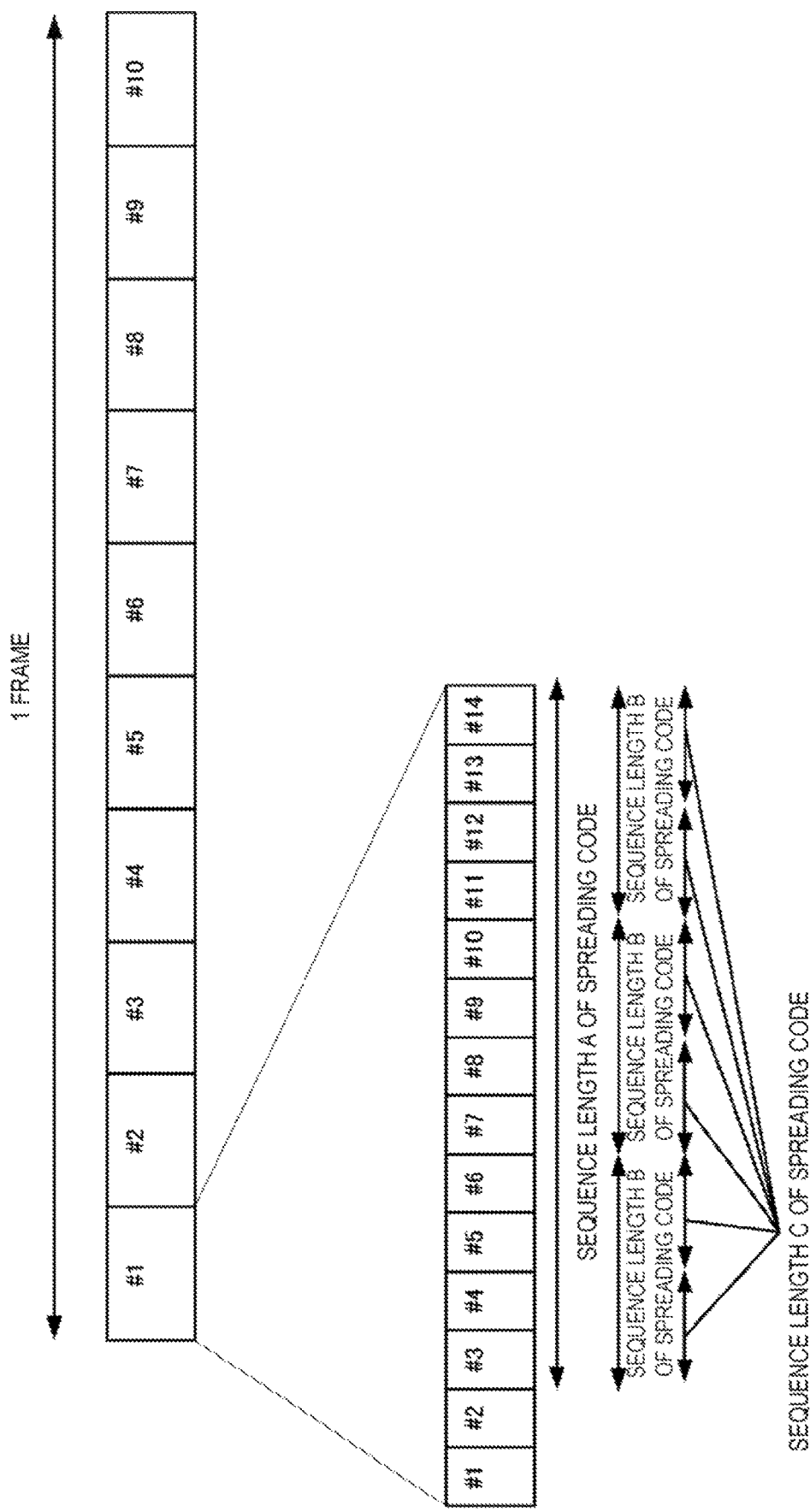
FIG. 25 is a diagram illustrating an example of code spreading in units of an OFDM symbol according to the present embodiment.

FIG. 25 illustrates an example of the code spreading in units of an OFDM symbol according to the present embodiment. FIG. 25 illustrates an example in which one frame includes 10 subframes and the data transmission is performed in units of one subframe. In the example, one subframe includes 14 OFDM symbols, and signals other than the data such as the reference signals are arranged in 2 OFDM symbols from the head. In the case that the terminal apparatus performs the data transmission in units of a subframe, as an example of the spreading in units of an OFDM symbol, the spreading code having a sequence length of 2, 4, or 12 (corresponding to a sequence length C, B, or A of the spreading code in FIG. 25) is used to perform the spreading in the time direction. Specifically, the spread unit 301 copies the OFDM symbol by the sequence length of the spreading code, and multiplies the spreading code. However, the sequence length of the spreading code in the present invention is not limited to this example, and the sequence length of the spreading code may be 3 or 6. Examples of the applied spreading code include a Walsh code, a cyclic shift, a Zadoff-Chu sequence, a PN sequence, a M sequence, and a Gold sequence. A spreading ratio indicating the sequence length of the spreading code may be variable, and for example, in a case that the spreading ratio different for each terminal apparatus is used, an Orthogonal Variable Spreading Factor (OVSF) code may be used. The spreading code having the sequence length of 1 (that is, the spreading code is not used) may be included.

The base station apparatus may notify the spreading ratio as the configuration control information (S200) in FIG. 3. For example, the base station apparatus may determine the spreading ratio not for each terminal apparatus but in units of the Component Carrier (CC, or also referred to as a Serving cell). In other words, in a case that each component carrier accommodates different number of terminal apparatuses capable of the contention based data transmission, the spreading ratio may be heightened in a case that the number of the accommodated terminals is large and the spreading ratio may be lowered in a case that the number of accommodated terminals is small. The spreading ratio may be changed in units of a base station apparatus, in units of a carrier frequency, in units of a subband such as a resource block group, or in units of a resource block.

Figure 26:
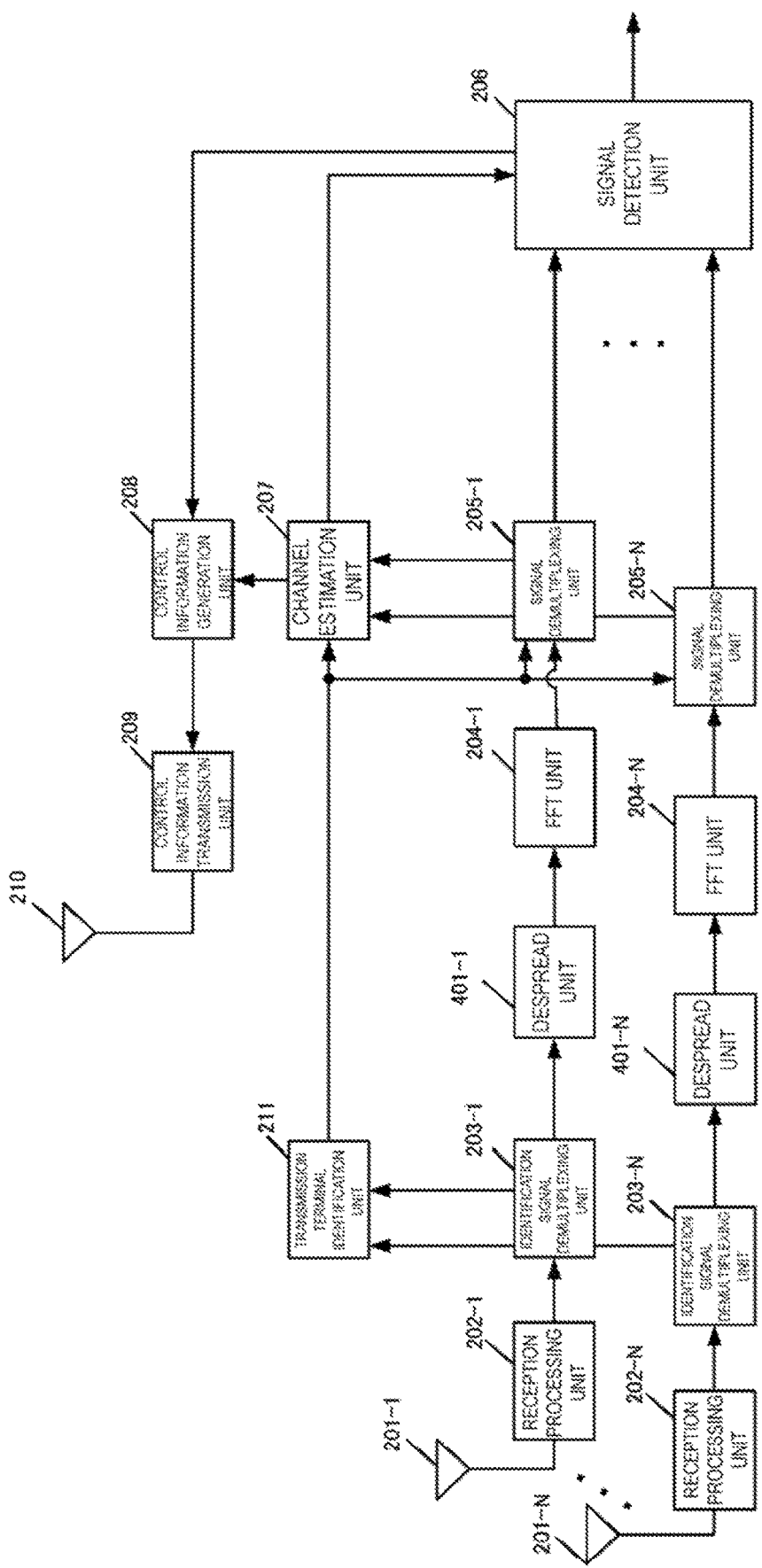
FIG. 26 is a diagram illustrating an example of a configuration of the base station apparatus according to the present embodiment.

FIG. 26 illustrates an example of a configuration of the base station apparatus according to the present embodiment. In FIG. 26, the configuration of the blocks is the same as in FIG. 12 except that despread units 401-1 to 401-N are added. Hereinafter, different processing is mainly described and the description of the same processing is omitted. The despread units 401-1 to 401-N receive the reception signal sequences input from the identification signal demultiplexing units 203-1 to 203-N, and despread the spread OFDM symbols. Specifically, each of the despread units 401-1 to 401-N synthesizes a complex conjugate of the spreading code by which the spread unit 301 in the terminal apparatus has applied spreading after division. For this reason, in a case that multiple terminal apparatuses performing the data transmission in the same subframe use different spreading codes, the despread processing is performed for each terminal apparatus.

Figure 27:
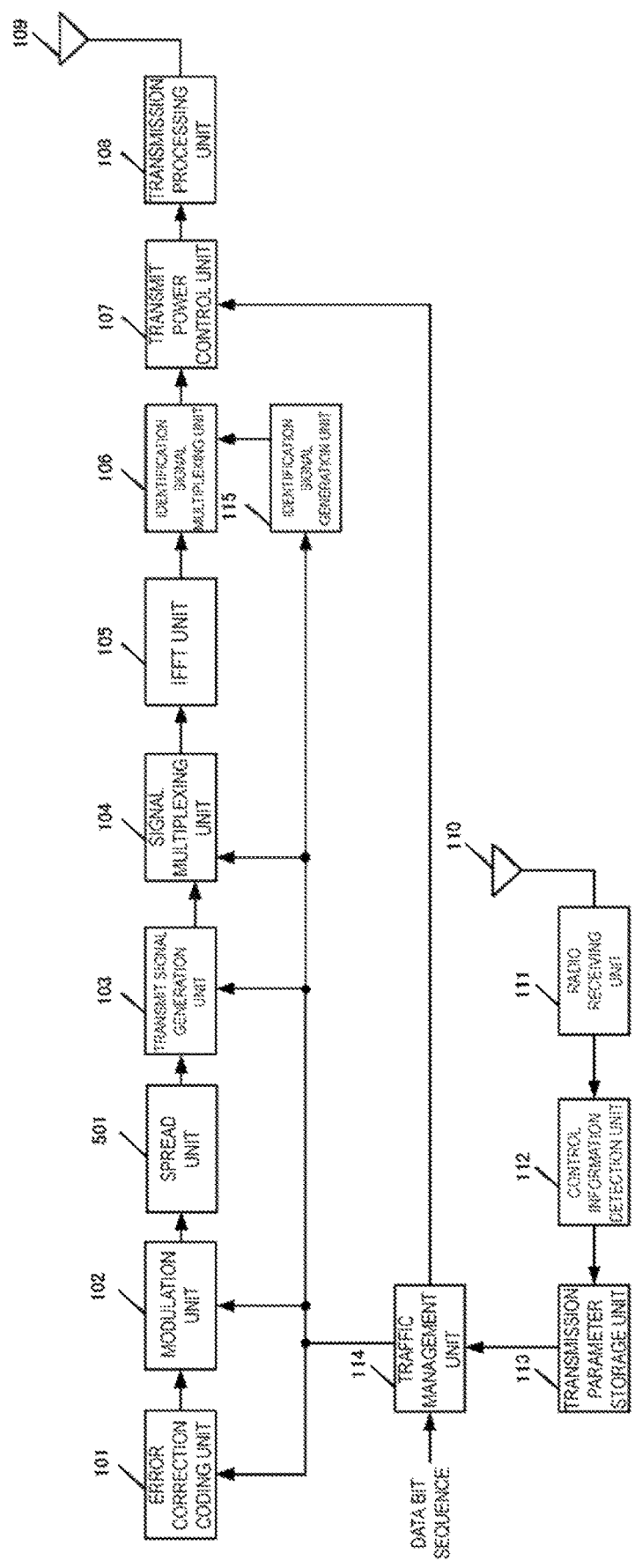
FIG. 27 is a diagram illustrating an example of a configuration of the terminal apparatus according to the present embodiment.
Figure 28:
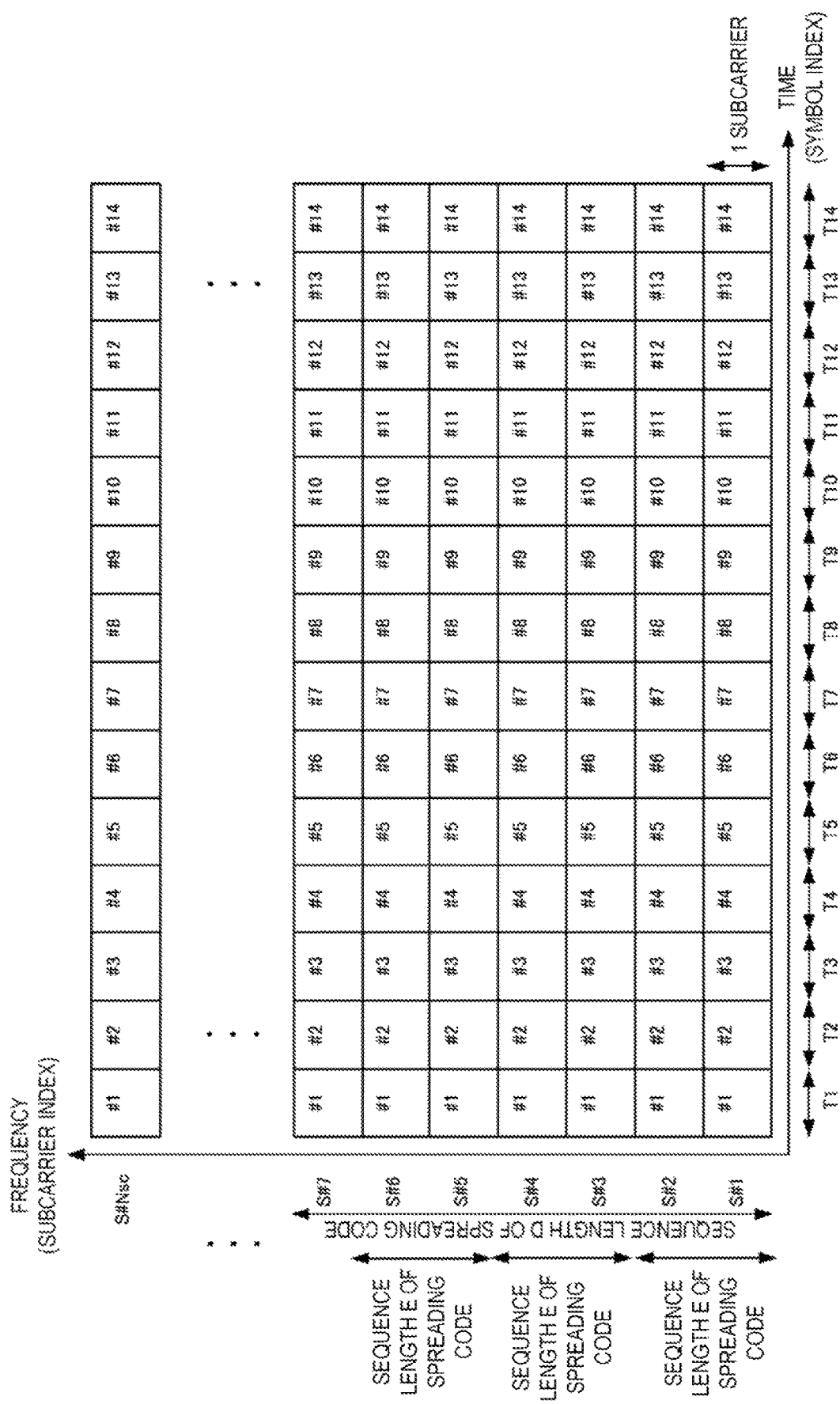
FIG. 28 is a diagram illustrating an example of an application of a spreading code according to the present embodiment.
Figure 29:
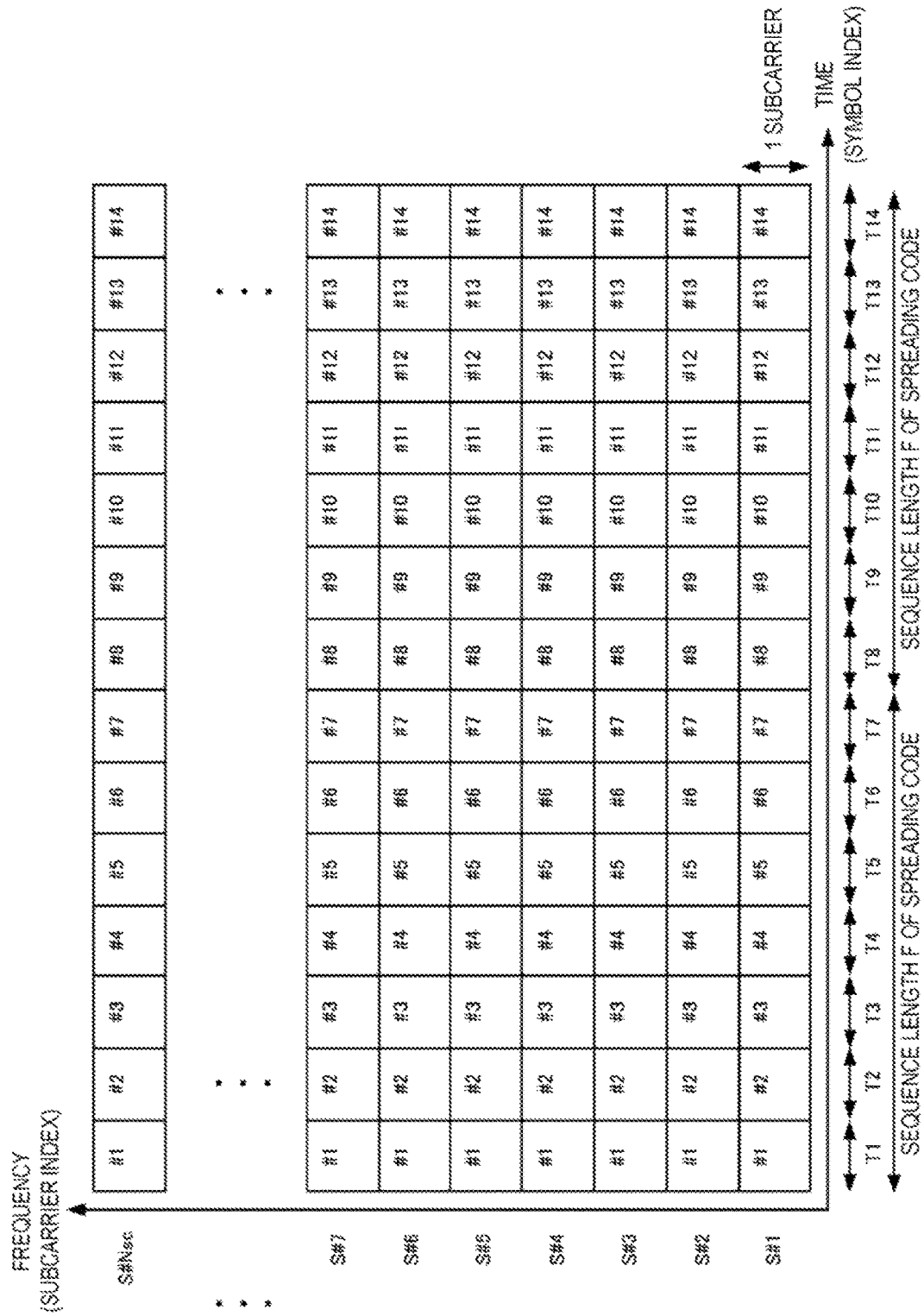
FIG. 29 is a diagram illustrating an example of an application of the spreading code according to the present embodiment.

The spreading code may be applied in the terminal apparatus configuration different from the configuration in FIG. 24. FIG. 27 illustrates an example of a configuration of the terminal apparatus according to the present embodiment. FIG. 27 illustrates the example in which a spread unit 501 is included, and the modulation symbol is spread by the spreading code. The spread unit 501 may adopt the spread method illustrated in FIG. 28 or FIG. 29. FIG. 28 illustrates an example in which a row of T1 to T14 represents a unit for the DFT, and the number of subcarriers $N_{SC}$ and the number 14 of OFDM symbols are used for the data transmission. In this case, the spread unit 501 spreads the modulation symbol before the DFT by using the spreading ratio 1, 2, 3, 4, 6, 8, or 12 (in FIG. 28, examples of the spreading ratios 7 and 2 are respectively denoted by the sequence lengths D and E of the spreading code) (hereinafter, referred to as intra-DFT spread). As a result, $14 \times N_{SC}$ time domain signal sequences are acquired, the DFT is performed every $N_{SC}$ time domain signal sequences. In FIG. 29, the spreading is not performed in the row T1 to T14 in which the DFT is performed (the intra-DFT spread is not performed), and the spreading is performed across the signals on which the DFT is performed (hereinafter, referred to as inter-DFT spread). In other words, using the spreading ratio of 2 for a description, the signal sequence in T1 is copied to T2, and the spreading code is applied in units of a row.

Figure 30:
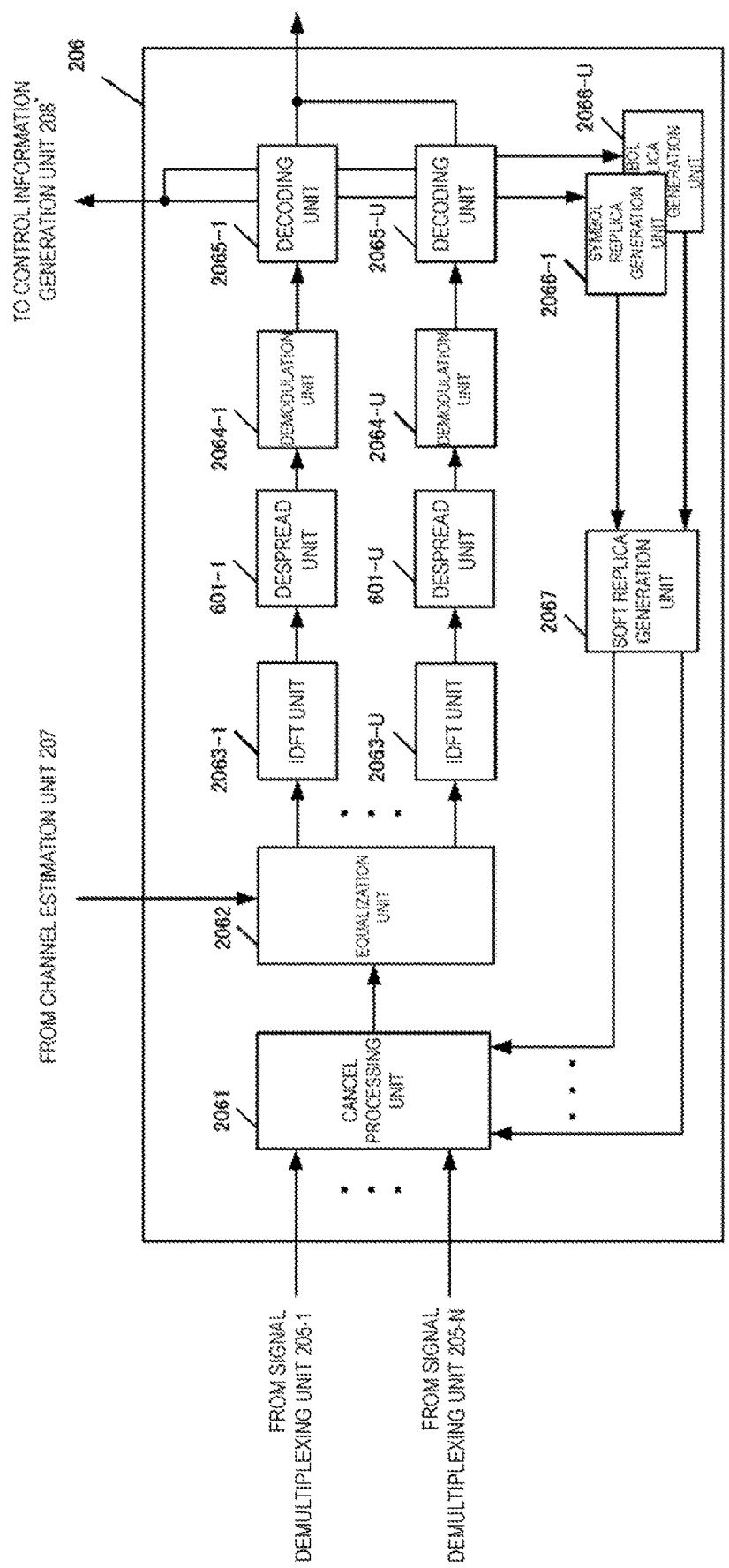
FIG. 30 is a diagram illustrating an example of a configuration of the signal detection unit 206 according to the present embodiment.

FIG. 30 illustrates an example of a configuration of the signal detection unit 206 according to the present embodiment. FIG. 30 illustrates a configuration in which despread units 601-1 to 601-U are added in the configuration in FIG. 14 to correspond to the configuration of the terminal apparatus in FIG. 27. In this case, each of the despread units 601-1 to 601-U multiplies the time domain signal sequence obtained by each of the IDFT units 2063-1 to 2063-U by a complex conjugate of spreading code used by each terminal apparatus, and then synthesizes the resultant. Each of the symbol replica generation units 2066-1 to 2066-U applies the spreading code applied by the terminal apparatus in a case of generating a replica.

Figure 31:
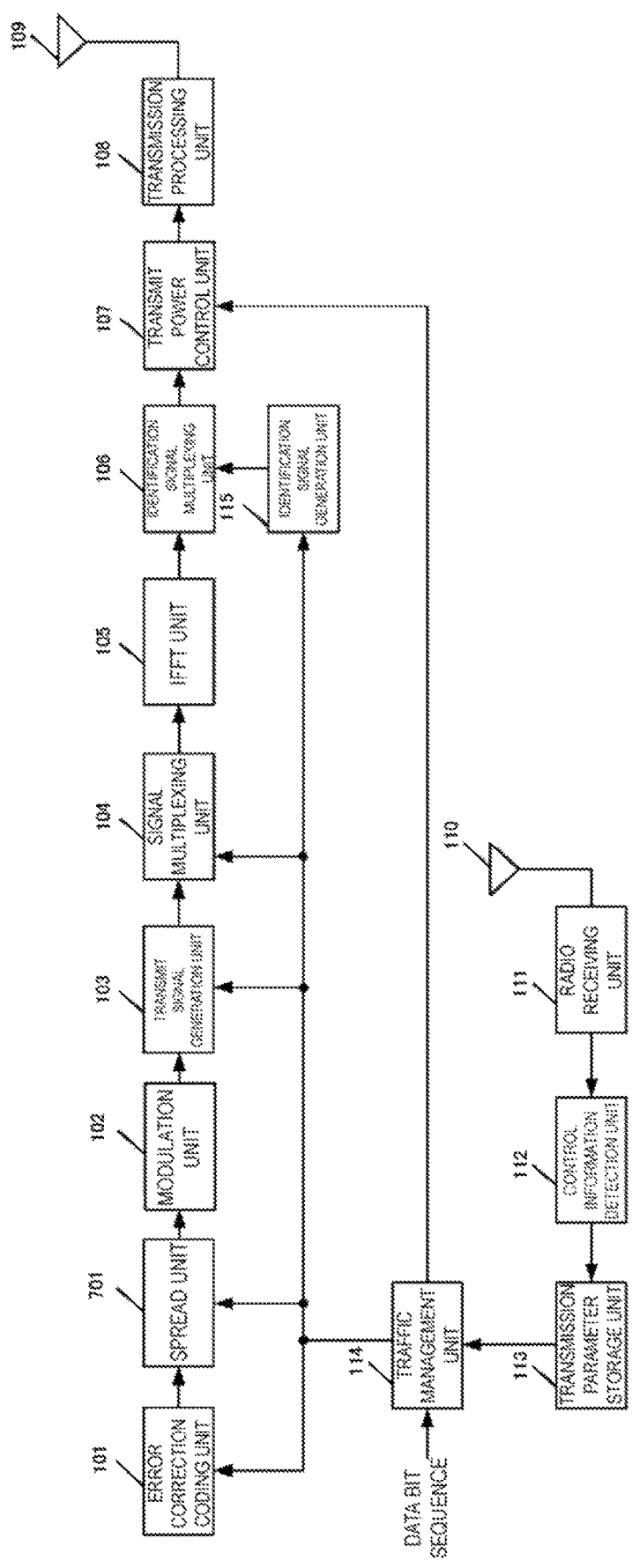
FIG. 31 is a diagram illustrating an example of a configuration of the terminal apparatus according to the present embodiment.

As another example of applying the spreading code, a configuration example in FIG. 31 may be used. FIG. 31 illustrates the example including a spread unit 701 which applies the spreading code to the coded bit sequence obtained by the error correction coding unit 101.

In the present embodiment, in a contention based radio communication technology, the terminal apparatus can select Whether to use the continuous subcarriers or interlace, and further can configure the subcarrier spacing used in the data transmission with interlacing for each terminal apparatus, as described above. The spreading ratio can be also configured for each terminal apparatus, each base station apparatus, or each component carrier such that flexible configuration can be made depending on the number of accommodated terminal apparatuses. As a result, in a case that the number of accommodated terminal apparatuses is large, the number of terminal apparatuses capable of simultaneously performing the data transmission is increased by heightening the spreading ratio although the transmission rate is lowered, and in a case that the number of accommodated terminal apparatuses is small, the transmission rate can be heightened, so an efficient contention based radio communication can be achieved. As a result, improvement of a reception quality and improvement of a frequency efficiency in the entire system can be achieved, and therefore, a large number of terminals can be efficiently accommodated.

Fifth Embodiment

In a fifth embodiment according to the present invention, a description is given of an example in which the resource allocation is configured based on information about the spreading code.

Figure 32:
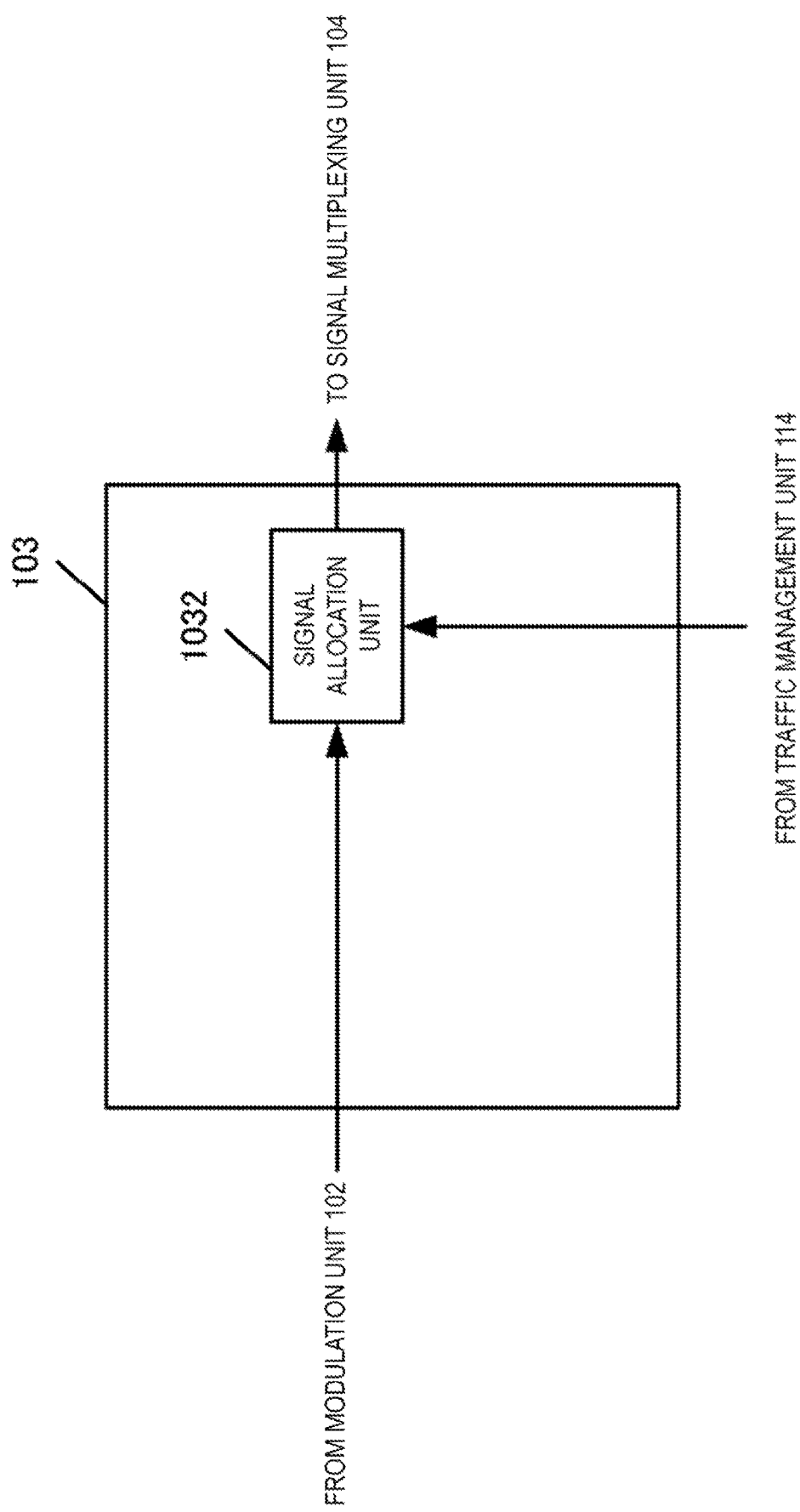
FIG. 32 is a diagram illustrating an example of a configuration of the transmit signal generation unit 103 according to the present embodiment.
Figure 33:
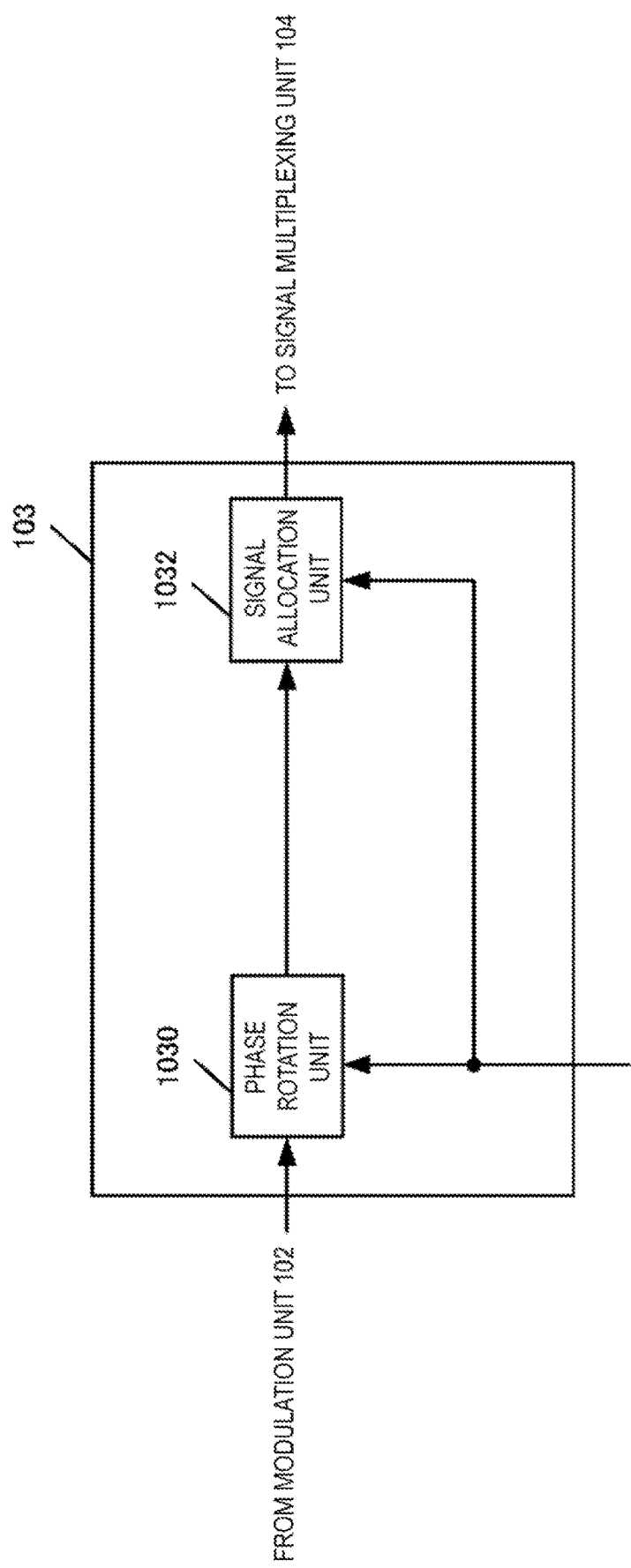
FIG. 33 is a diagram illustrating an example of a configuration of the transmit signal generation unit 103 according to the present embodiment.
Figure 34:
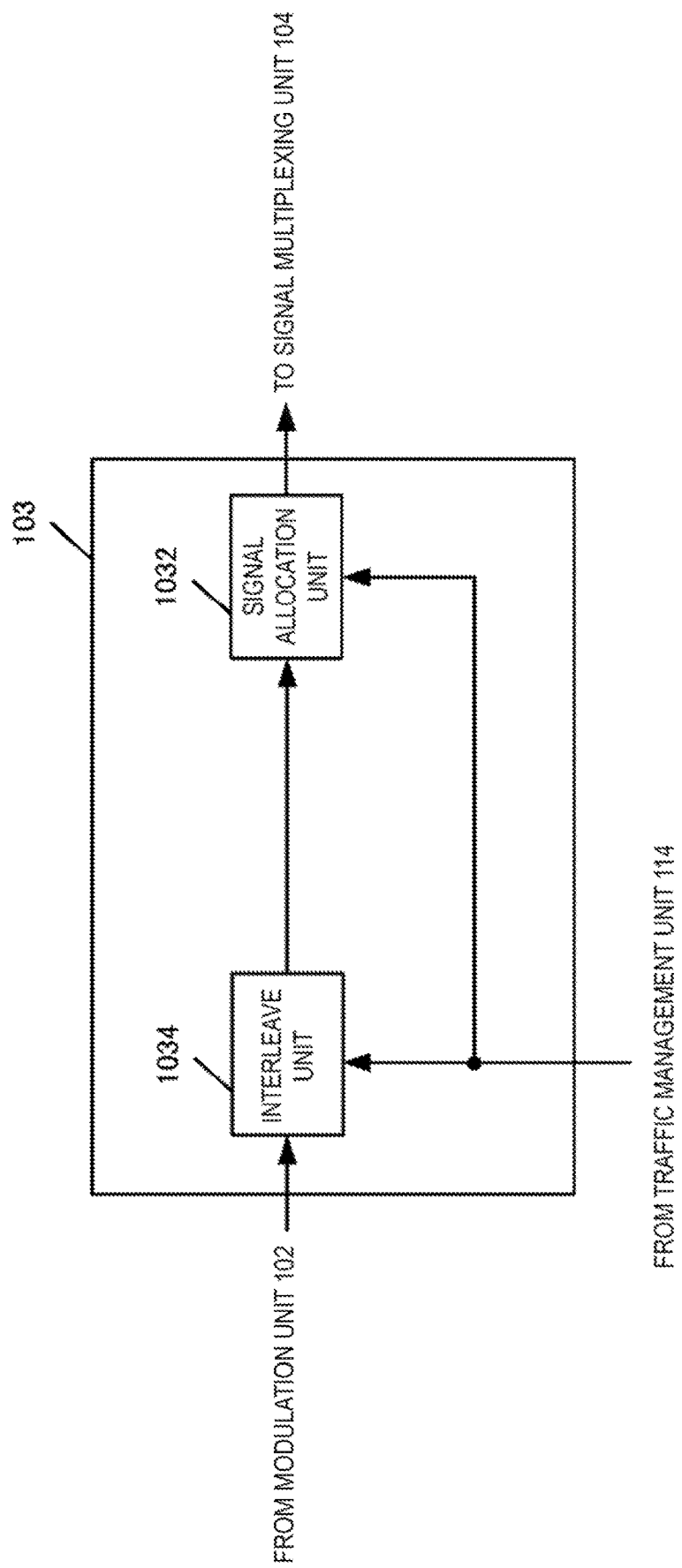
FIG. 34 is a diagram illustrating an example of a configuration of the transmit signal generation unit 103 according to the present embodiment.
Figure 35:
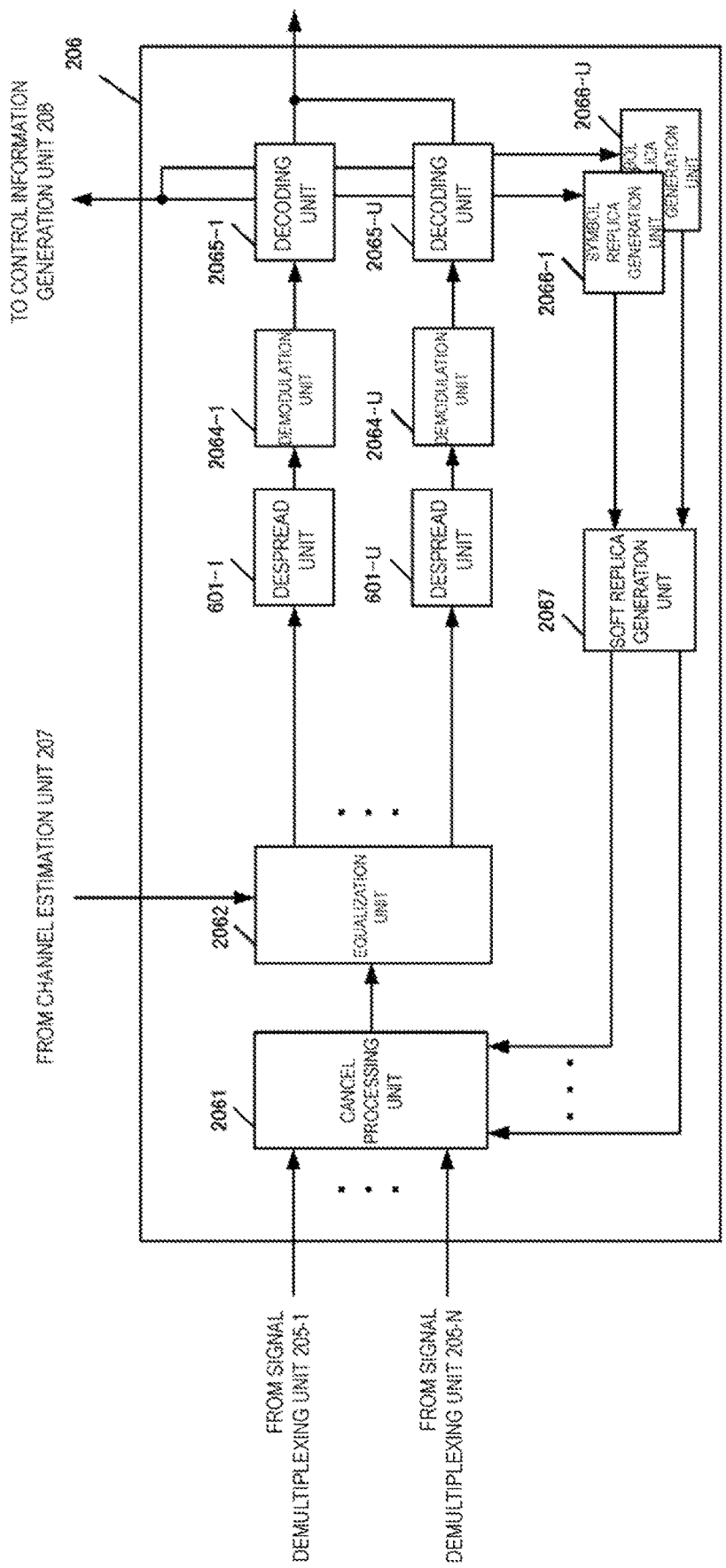
FIG. 35 is a diagram illustrating an example of a configuration of the signal detection unit 206 according to the present embodiment.

In the present embodiment, the configuration example of the terminal apparatus is illustrated in FIGS. 7, 8, 9, 10, 11, and 24, and the configuration example of the base station apparatus is illustrated in FIGS. 13, 1.4, and 26. However, the terminal apparatus and the base station apparatus may have the configurations in FIG. 27 or 31, and FIG. 30. The present embodiment may be applied to multicarrier transmission, and the transmit signal generation unit 103 in the terminal apparatus may have the configuration without the DFT unit 1031 as in FIGS. 32 to 34. The signal detection unit 206 in the base station apparatus in such a case may have a configuration without the HAFT units 2063-1 to 2063-U as in FIG. 35. In the present embodiment, the configuration information transmitted by the base station apparatus in FIG. 3 (S200) is associated with the information of the subcarrier used for the data transmission and the information about the spreading code, and transmitted. The sequence length of the spreading code is made identical for the all terminal apparatuses and the spreading code is made to contain 0. To be more specific, the terminal apparatus (e.g., UE #1) using the continuous subcarriers as in FIG. 16 is a case of the allocation of the spreading code not containing 0, and the terminal apparatus using the subcarrier by interlacing is allocated with the spreading code containing 0, that is a case that the spreading codes not 0 are at equal intervals. The UE #2 is an example in which a frequency index with even number is assigned with 0. Intervals between elements that are not 0 in the spreading code may be configured to be different for each terminal apparatus (e.g., UE #2 to UE #8), and in this case, even in a case that multiple terminal apparatuses perform the data transmission in the same subframe using a contention based radio communication technology, interference power is decreased. The sequence length of the spreading code may be varied depending on the number of numerals 0 contained in the spreading code. For example, like the terminal apparatuses UE #2 and LIE #7 in FIG. 16, the spreading codes may be allocated which are orthogonal between the terminal apparatuses that the intervals between elements that are not 0 in the spreading code are integral multiples.

In the present embodiment, the application example in FIG. 16 as the case of the interlacing is illustrated, but the present embodiment may be applied to the use of the subcarriers in FIGS. 17 and 19, or may be applied to the case of an unequal interval as in FIG. 18. In FIG. 16 to FIG. 19, the sequence of the spreading code to be applied may be different depending on the number of elements that are not 0 in the spreading code. In FIG. 16 to FIG. 19, the sequence of the spreading code to be applied may be switched depending on the number of elements that are not 0 in the spreading code. For example, it may be assumed that in a case that the number of elements that are not 0 is a value represented by power of 2, the Walsh Code may be used, and in other cases, any of the following including a PN sequence, a Gold sequence, a M sequence, and a cyclic shift may be used. It may be assumed that in a case that the number of elements that are not 0 is 8 or less, the Walsh Code may be used, and in a case that the number of elements that are not 0 is more than 8, any of the following including a PN sequence, a Gold sequence, a NI sequence, and a cyclic shift may be used.

In the present embodiment, in a contention based radio communication technology, the subcarrier to be used is determined based on the information about the spreading code, as described above. Furthermore, the sequence of the spreading code is switched depending on the number of elements that are not 0 contained in the spreading code. As a result, in the case that the number of accommodated terminal apparatuses is large, the number of terminal apparatuses capable of simultaneously performing the data transmission is increased by using the spreading code containing a larger number of elements of 0 although the number of subcarriers is decreased, and in the case that the number of accommodated terminal apparatuses is small, the spreading code containing a smaller number of elements of 0 is used to increase the number of subcarriers to be used, so the efficient contention based radio communication can be achieved. Therefore, improvement of reception quality and improvement of frequency efficiency in the entire system can be achieved, and therefore, a large number of terminals can be efficiently accommodated.

A program running on a device according to the present invention may serve as a program that controls a Central Processing Unit (CPU) and the like to cause a computer to operate in such a manner as to realize the functions of the embodiments according to the present invention. A program or information handled by the program is transitorily stored in a volatile memory such as a Random Access Memory (RAM), a non-volatile memory such as a flash memory, a Hard Disk Drive (HDD), or other storage device systems.

The program for implementing the functions according the embodiments of the present invention may be recorded on a computer-readable recording medium. The functions may be implemented by causing a computer system to read the program recorded on this recording medium for execution. It is assumed that the "computer system" refers to a computer system built into the devices, and the computer system includes an operating system and hardware components such as a peripheral device. The "computer-readable recording medium" may include a semiconductor recording medium, an optical recording medium, a magnetic recording medium, a medium dynamically holding a program for a short time, or other computer-readable recording media.

The respective functional blocks or features of the devices used in the above-described embodiments may be installed or performed by an electrical circuit, for example, an integrated circuit or multiple integrated circuits. The electrical circuit designed to perform the functions described in this specification may include a general-purpose processor, a digital signal processor (DSP), an application specific integrated circuit (ASIC), a field programmable gate array signal (FPGA), or other programmable logic devices, discrete gates or transistor logic, discrete hardware components, or combinations thereof. The general-purpose processor may be a microprocessor, a processor of a known type, a controller, a micro-controller, or a state machine. The electrical circuit described above may be constituted by a digital circuit, or an analog circuit. Furthermore, in a case that with advances in semiconductor technology, a circuit integration technology with which the current integrated circuit is replaced appears, the present invention can also use a new integrated circuit based on the technology.

Note that the invention of the present patent application is not limited to the above-described embodiments. In the embodiments, devices have been described as an example, but the invention of the present application is not limited to these devices, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

The present international application claims priority based on JP 2016-096133 filed on May 12, 2016 and JP 2016-157352 filed on Aug. 10, 2016, and all the contents of JP 2016-096133 and JP 2016-157352 are incorporated in the present international application by reference.

REFERENCE SIGNS LIST

10 Base station apparatus
20-1 to 20-Nm Terminal apparatus
101 Error correction coding unit
102 Modulation unit
103 Transmit signal generation unit
104 Signal multiplexing unit
105 IFFT unit
106 Identification signal multiplexing unit
107 Transmit power control unit
108 Transmission processing unit
109 Transmit antenna
110 Receive antenna
111 Radio receiving unit
112 Control information detection unit
113 Transmission parameter storage unit
114 Traffic management unit
1030 Phase rotation unit
1031 DFT unit
1032 Signal allocation unit
1033 Phase rotation unit
1034 interleave unit
1041 Reference signal multiplexing unit
1042 Reference signal generation unit
1043 Control information multiplexing unit
1044 Control information generation unit
201-1 to 201-N Receive antenna
202-1 to 202-N Reception processing unit
203-1 to 203-N Identification signal demultiplexing unit
204-1 to 204-N FFT unit
205-1 to 205-N Signal demultiplexing unit
206 Signal detection unit
207 Channel estimation unit
208 Uplink control information generation unit
209 Control information transmission unit
210 Transmit antenna
211 Transmission terminal identification unit
2051 Reference signal demultiplexing unit
2052 Control information demultiplexing unit
2053 Allocation signal extraction unit
2054 Control information detection unit
2061 Cancel processing unit
2062 Equalization unit
2063-1 to 2063-U TUFT unit
2064-1 to 2064-U Demodulation unit
2065-1 to 2065-U Decoding unit
2066-1 to 2066-U Symbol replica generation unit
2067 Soft replica generation unit
301 Spread unit
401-1 to 401-N Despread unit
501 Spread unit
601-1 to 601-U Despread unit
701 Spread unit

The invention claimed is:

1. A transmission device for transmitting a data signal to a reception device, the transmission device comprising:
a transmission processing unit configured to transmit the data signal without receiving control information for transmission authorization transmitted by the reception device;
an identification signal multiplexing unit configured to multiplex an identification signal on an orthogonal resource; and
a receiving unit configured to receive a transmission parameter in advance, the transmission parameter indicating, for transmitting the data signal, a use of a continuous frequency resource and a use of a discontinuous and equal interval frequency resource, wherein
the transmission processing unit transmits the data signal, based on the transmission parameter by at least one of a first data transmission to transmit the data signal by using the continuous frequency resource, and a second data transmission to transmit the data by using the discontinuous and equal interval frequency resource.

2. The transmission device according to claim 1, wherein the transmission processing unit uses a third data transmission to transmit the data signal by using a discontinuous and unequal interval frequency resource.

3. The transmission device according to claim 1, wherein the identification signal multiplexing unit multiplexes the identification signal on a frequency resource different from a frequency resource used to transmit the data signal.

4. The transmission device according to claim 3, wherein the identification signal multiplexing unit multiplexes the identification signal on a number of frequency resources which is more than a number of frequency resources used to transmit the data signal.

5. The transmission device according to claim 1, wherein the transmission processing unit determines an Orthogonal Frequency Division Multiplexing (OFDM) symbol to be used depending on a subframe number for transmitting the data signal in a case that only some of OFDM symbols in a subframe are used to transmit the data signal.

6. The transmission device according to claim 1, wherein the transmission processing unit determines a slot to be used depending on a subframe number for transmitting the data signal in a case that only some of OFDM symbols in a subframe are used to transmit the data signal.

7. A reception device for receiving a data signal from each of multiple transmission devices, the reception device comprising:
a reception processing unit configured to receive the data signal transmitted without transmitting control information for transmission authorization;
an identification signal demultiplexing unit configured to demultiplex an identification signal received together with the data signal from an orthogonal resource;
a transmission terminal identification unit configured to identify, based on the identification signal, a transmission device of the multiple transmission devices that performed data transmission; and
a control information transmission unit configured to transmit in advance a transmission parameter to be used for the data transmission,
wherein the transmission parameter transmitted by the control information transmission unit includes information of a frequency resource used for the data transmission for each of the multiple transmission devices, the information of the frequency resource indicating a use of a continuous frequency resource and a use of a discontinuous and equal interval frequency resource.

8. The reception device according to claim 7, wherein the information of the frequency resource includes a discontinuous and unequal interval frequency resource.

9. The reception device according to claim 7, wherein the information of the frequency resource included in the transmission parameter transmitted by the control information transmission unit is different from the frequency resource used to transmit the identification signal.

10. The reception device according to claim 7, wherein the reception processing unit computes an Orthogonal Frequency Division Mulitplexing (OFDM) symbol for receiving the data signal from a subframe number in a case that the transmission device uses only some of OFDM symbols in a subframe to transmit the data signal.

11. A communication method of a transmission device for transmitting a data signal to a reception device, the communication method comprising the steps of:
    transmitting the data signal without receiving control information for transmission authorization transmitted by the reception device;
    multiplexing an identification signal on an orthogonal resource; and receiving a transmission parameter in advance,
    the transmission parameter indicating, for transmitting the data signal, a use of a continuous frequency resource and a use of a discontinuous and equal interval frequency resource, wherein in the transmitting step, the data signal is transmitted, based on the transmission parameter by any of a first data transmission to transmit the data signal by using the continuous frequency resource, and a second data transmission to transmit the data by using the discontinuous and equal interval frequency resource.

12. A communication method of a reception device for receiving a data signal from each of multiple transmission devices, the communication method comprising the steps of:
    receiving the data signal transmitted without transmitting control information for transmission authorization;
    demultiplexing an identification signal received together with the data signal from an orthogonal resource;
    identifying, based on the identification signal, a transmission device of the multiple transmission devices that performed data transmission; and
    transmitting in advance a transmission parameter to be used for the data transmission,
    wherein the transmission parameter includes information of a frequency resource used for the data transmission for each of the multiple transmission devices, the information of the frequency resource indicating a use of a continuous frequency resource and a use of a discontinuous and equal interval frequency resource.

* * * * *